United States Patent
Oh et al.

(10) Patent No.: US 12,292,618 B2
(45) Date of Patent: May 6, 2025

(54) CAMERA ACTUATOR AND CAMERA MODULE COMPRISING SAME

(71) Applicant: LG INNOTEK CO., LTD., Seoul (KR)

(72) Inventors: Jun Seok Oh, Seoul (KR); Min Ji Kim, Seoul (KR); Jae Gwang Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 489 days.

(21) Appl. No.: 17/767,235

(22) PCT Filed: Oct. 8, 2020

(86) PCT No.: PCT/KR2020/013736
§ 371 (c)(1),
(2) Date: Apr. 7, 2022

(87) PCT Pub. No.: WO2021/071284
PCT Pub. Date: Apr. 15, 2021

(65) Prior Publication Data
US 2022/0382013 A1    Dec. 1, 2022

(30) Foreign Application Priority Data

Oct. 10, 2019  (KR) .................. 10-2019-0125393
Oct. 15, 2019  (KR) .................. 10-2019-0127907

(51) Int. Cl.
*G02B 7/10* (2021.01)
*G03B 13/36* (2021.01)
*G03B 17/12* (2021.01)

(52) U.S. Cl.
CPC .............. *G02B 7/10* (2013.01); *G03B 13/36* (2013.01); *G03B 17/12* (2013.01)

(58) Field of Classification Search
CPC ........... G02B 7/10; G03B 13/36; G03B 17/12
(Continued)

(56) References Cited

U.S. PATENT DOCUMENTS 5,905,598 A * 5/1999 Shimada ............... G02B 7/10
                                                    359/694
7,061,700 B2 * 6/2006 Honsho .................. G02B 7/08
                                                    359/699
(Continued)

FOREIGN PATENT DOCUMENTS

KR     10-0646560      11/2006
KR     10-0849580       7/2008
(Continued)

OTHER PUBLICATIONS

Extended European Search Report dated Oct. 18, 2023 issued in Application No. 20875006.7.
(Continued)

*Primary Examiner* — Wyatt A Stoffa
*Assistant Examiner* — Seth D Moser
(74) *Attorney, Agent, or Firm* — KED & ASSOCIATES, LLP

(57) ABSTRACT

A camera module according to an embodiment of the present invention includes: a lens group; a lens support unit for accommodating the lens group; a magnet arranged on the outer surface of the lens support unit; a yoke portion spaced apart from the magnet and arranged to face the magnet; and a coil arranged on the yoke portion so as to be spaced apart from and to face the magnet between the magnet and the yoke portion, wherein the lens group, the lens support unit, and the magnet move together along an optical axis according to a current applied to the coil, the yoke portion includes a first yoke and a second yoke arranged on the first yoke, the second yoke is arranged between the first yoke and the coil, and magnetism of the first yoke is stronger than that of the second yoke.

9 Claims, 28 Drawing Sheets

(58) Field of Classification Search
USPC .......................................................... 359/699
See application file for complete search history.

(56) References Cited

U.S. PATENT DOCUMENTS

| | | | |
|---|---|---|---|
| 9,658,514 B2* | 5/2017 | Baik | ......................... G02B 7/04 |
| 11,409,073 B2* | 8/2022 | Lee | ...................... G02B 7/1805 |
| 2016/0246029 A1* | 8/2016 | Kim | .......................... G02B 7/08 |
| 2020/0244887 A1 | 7/2020 | Ishida et al. | |
| 2020/0409015 A1 | 12/2020 | Kim et al. | |
| 2023/0305367 A1* | 9/2023 | Mori | ....................... G03B 17/12 |

FOREIGN PATENT DOCUMENTS

| | | |
|---|---|---|
| KR | 10-1332043 | 11/2013 |
| KR | 10-2018-0137278 | 12/2018 |
| KR | 10-2019-0008701 | 1/2019 |
| KR | 10-2019-0103862 | 9/2019 |
| WO | WO 2019/031146 | 2/2019 |

OTHER PUBLICATIONS

International Search Report dated Jan. 15, 2021 issued in Application No. PCT/KR2020/013736.
Korean Office Action dated Jan. 7, 2025 issued in Application No. 10-2019-0127907.

* cited by examiner

[FIG. 1]
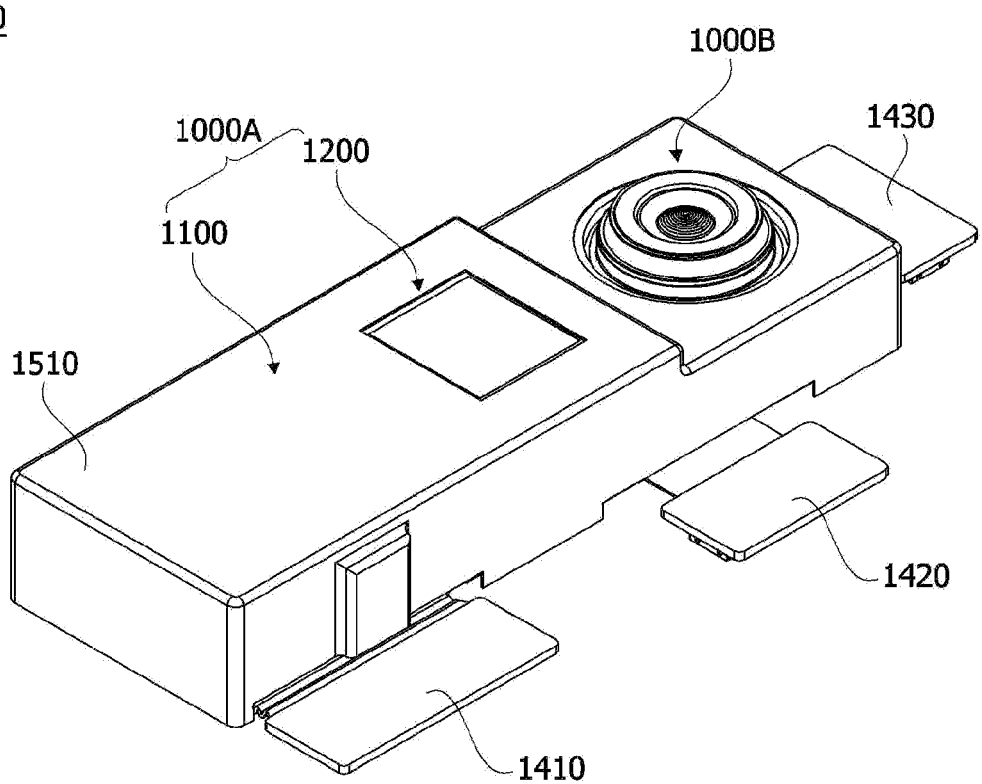

[FIG. 2a]
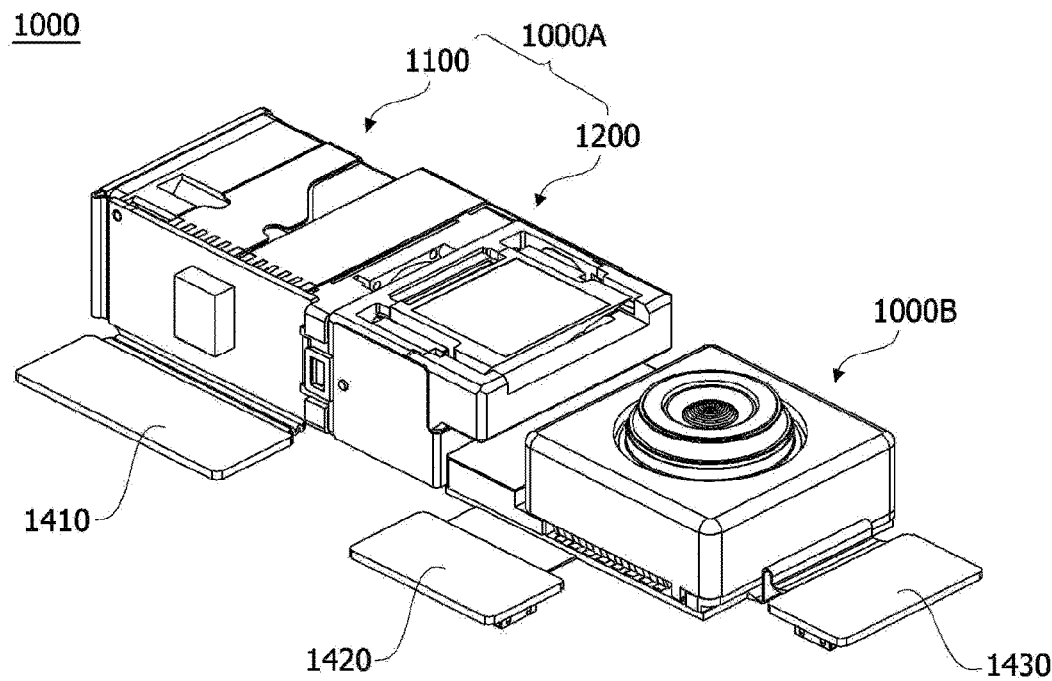
[FIG. 2b]
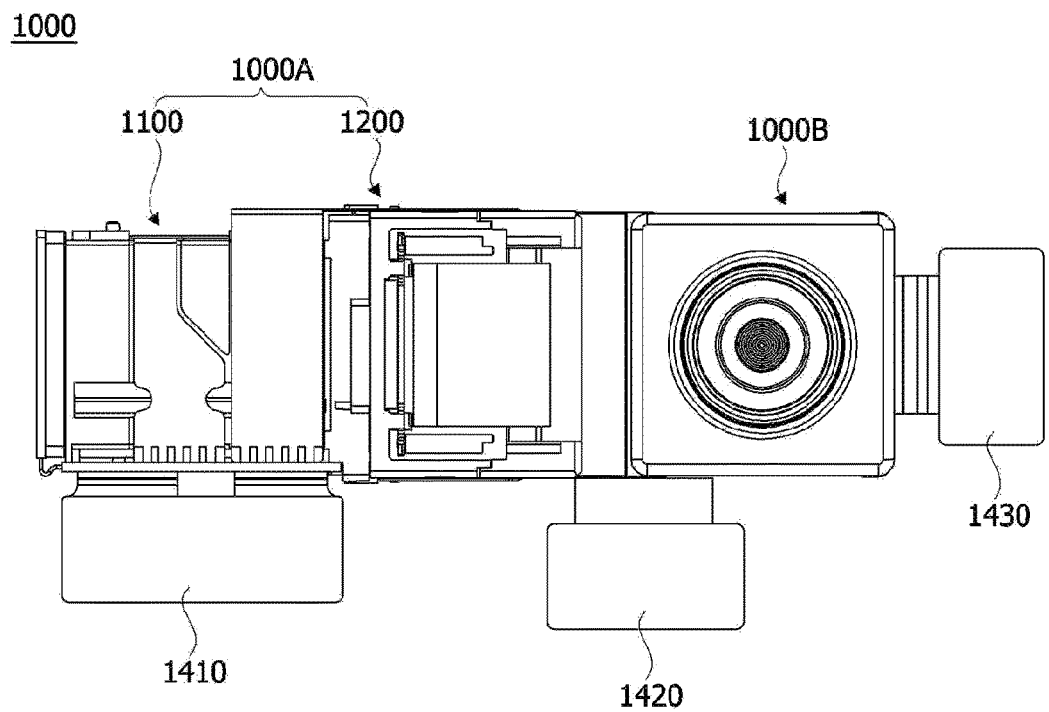

[FIG. 3a]
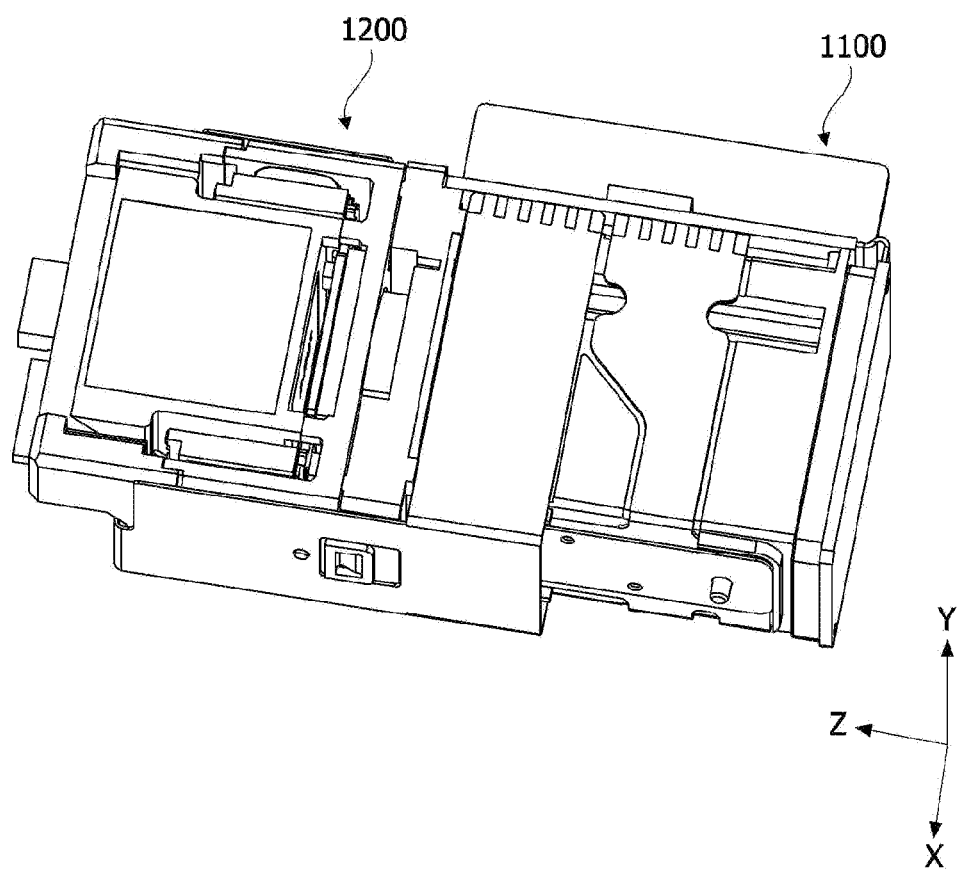

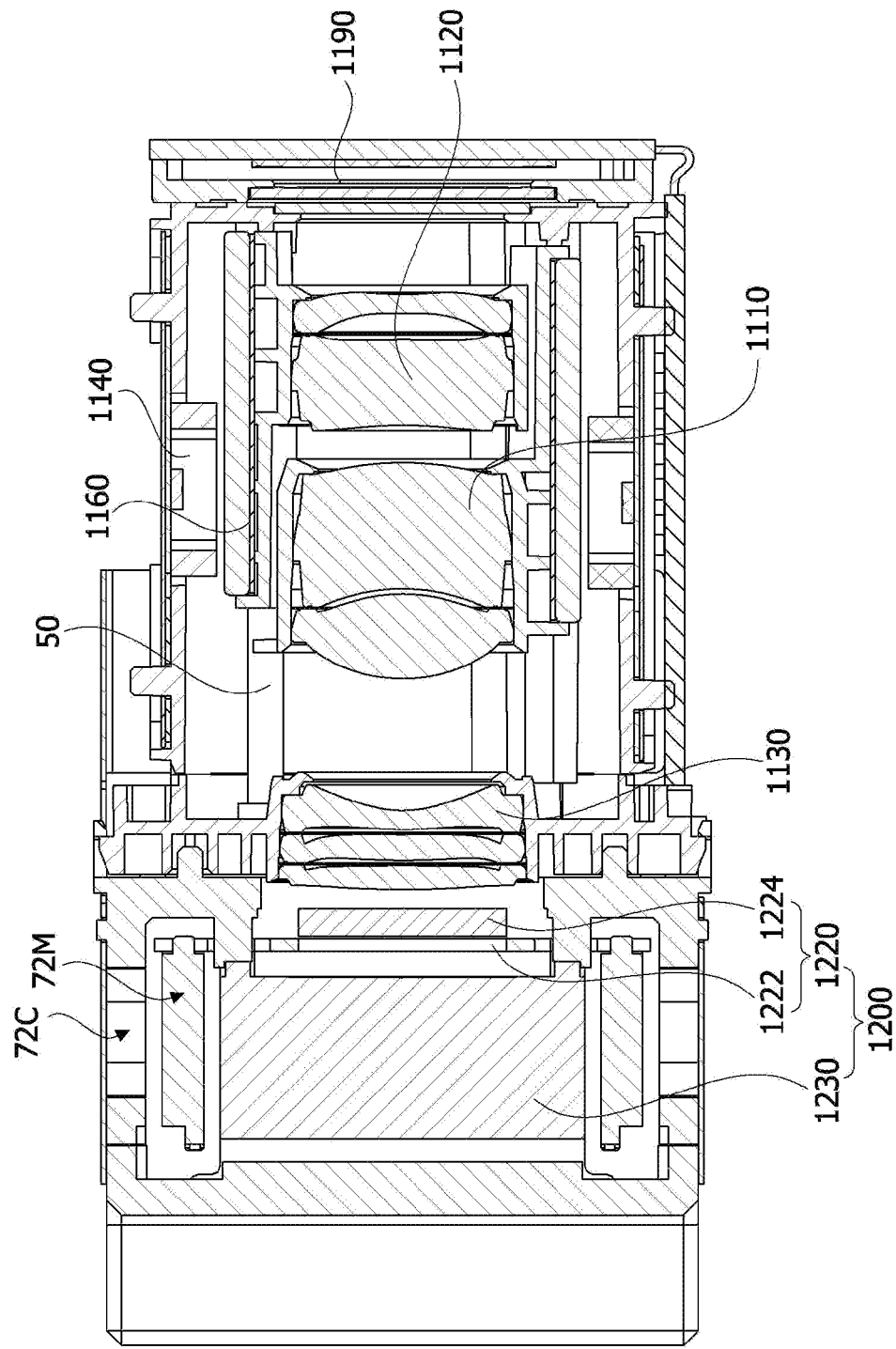
[FIG. 3b]

[FIG. 4]
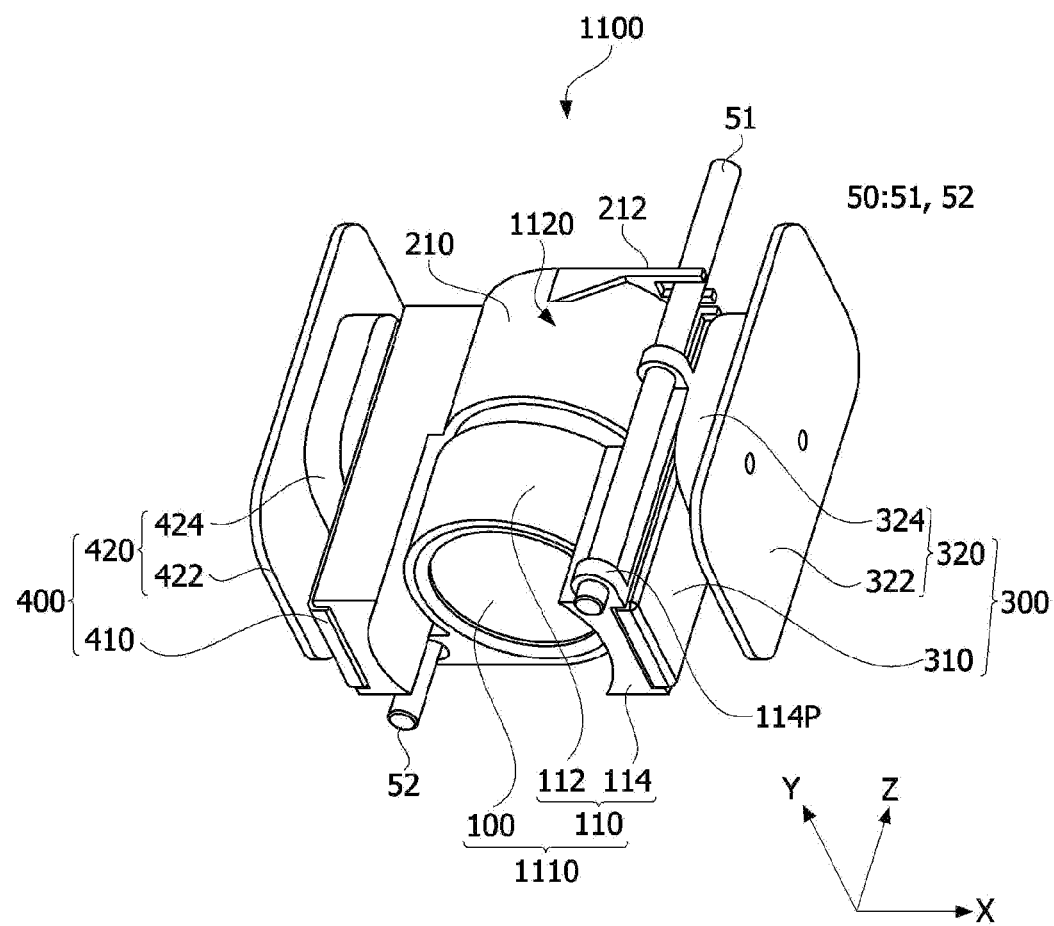

[FIG. 5]
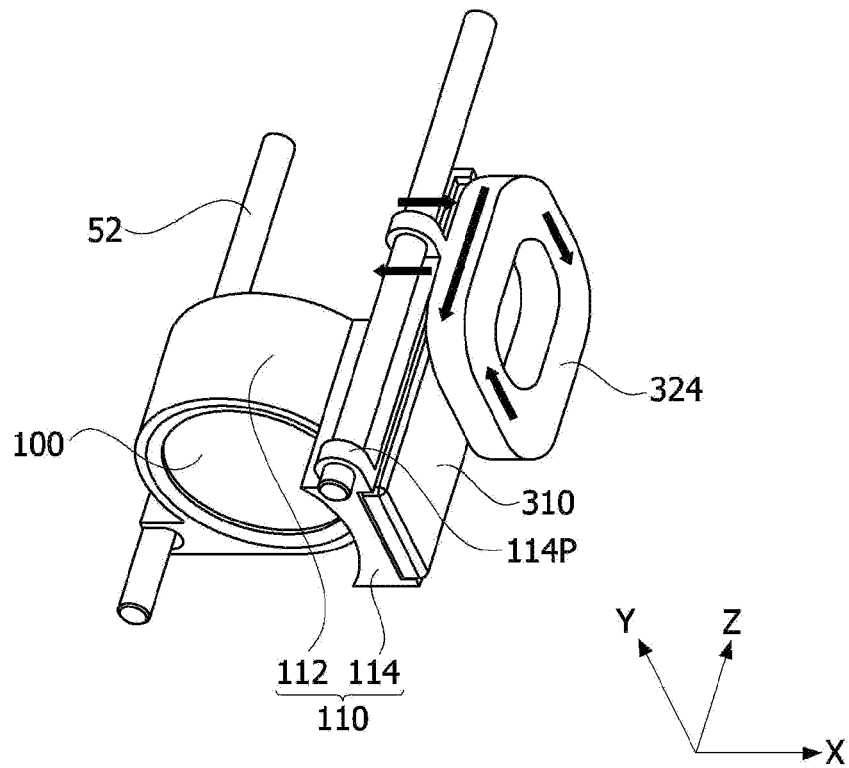
[FIG. 6]
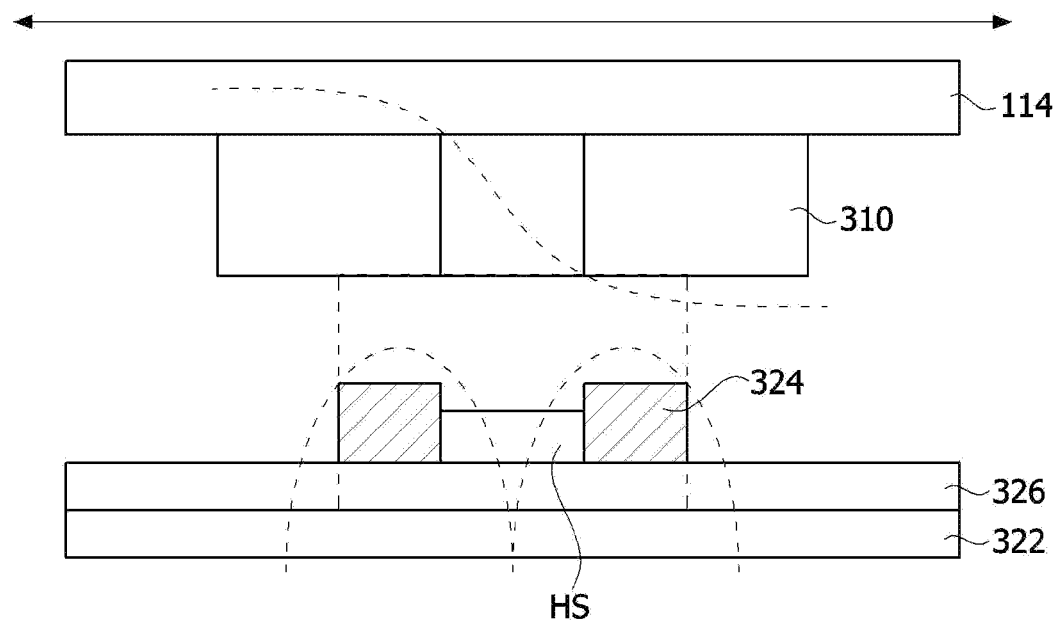

[FIG. 7]
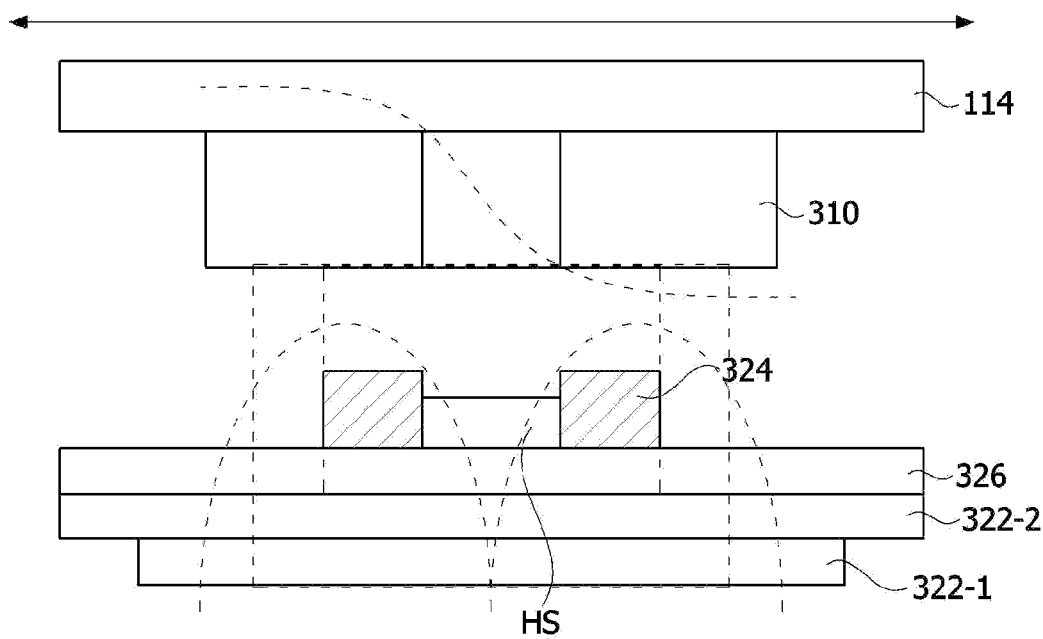
[FIG. 8]
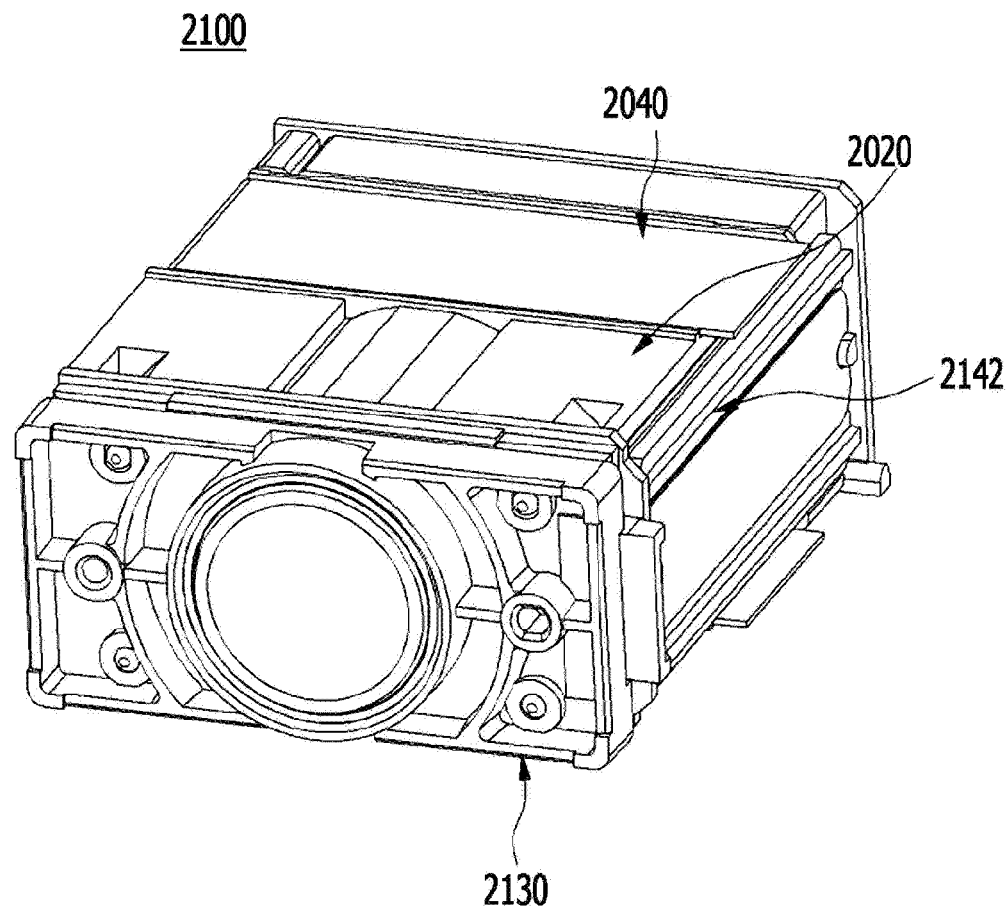

[FIG. 9]
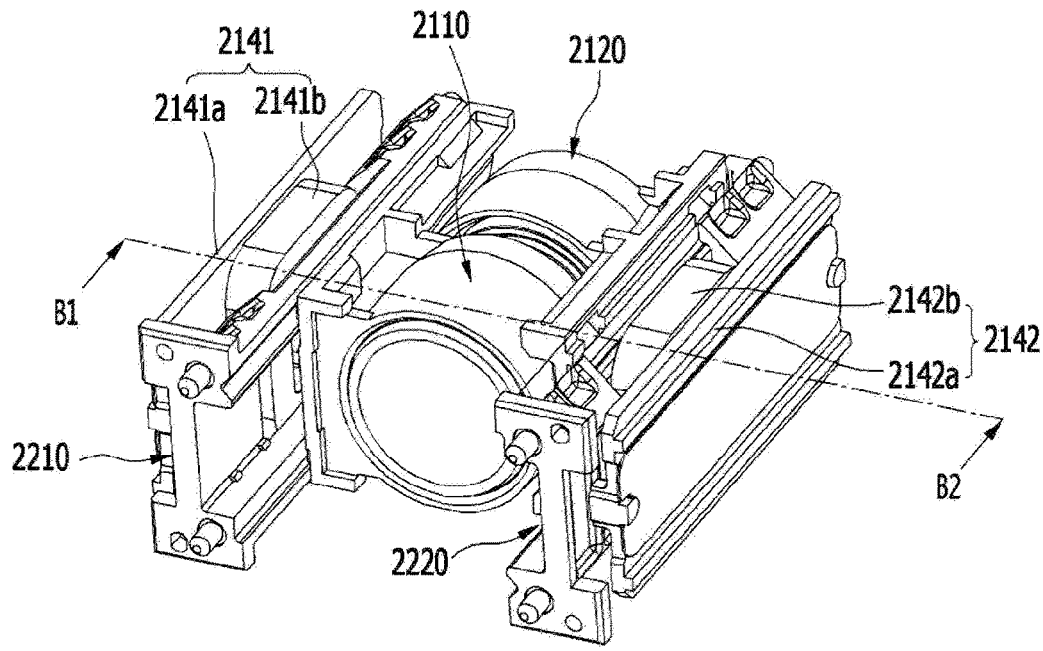
[FIG. 10]
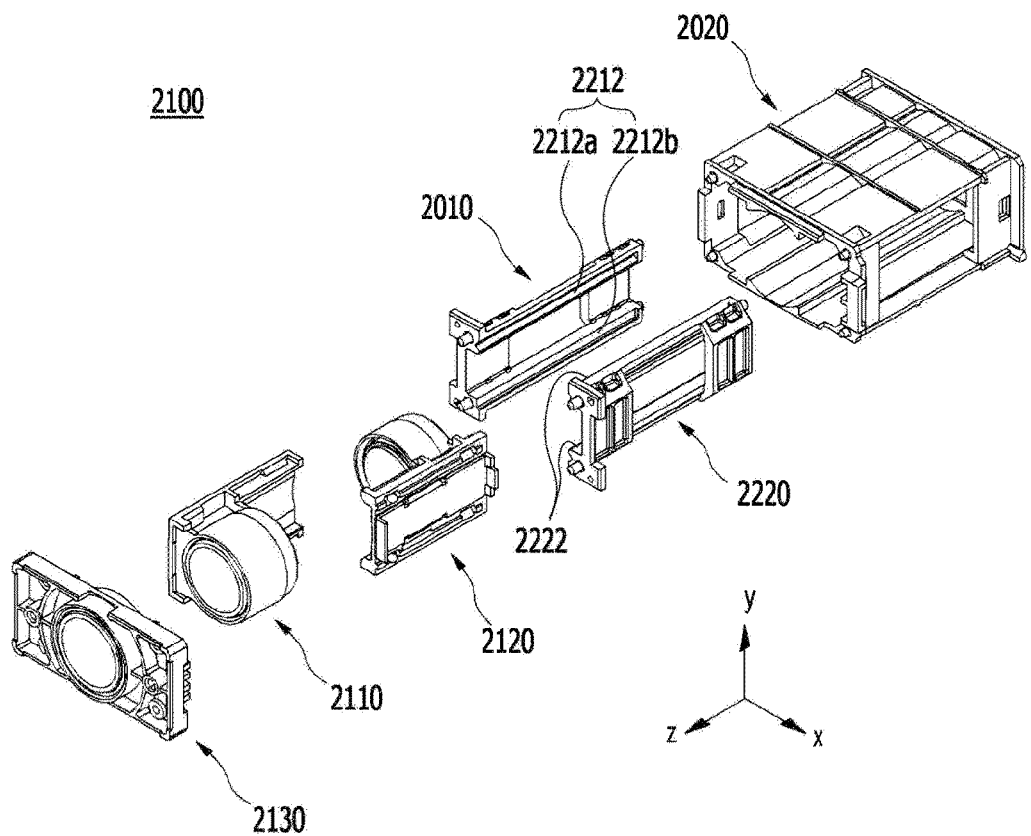

[FIG. 11a]
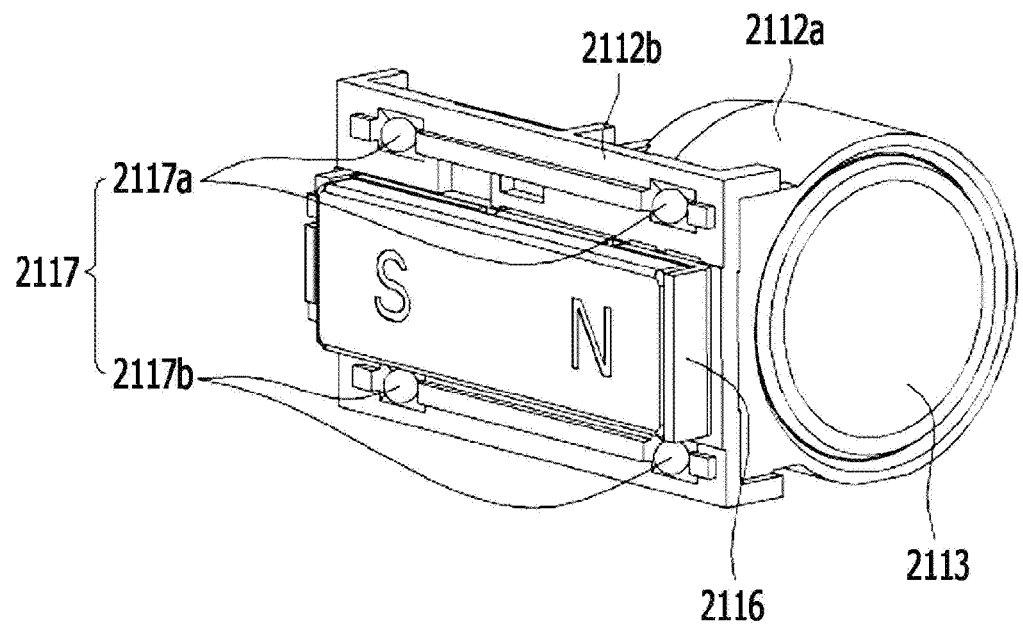
[FIG. 11b]
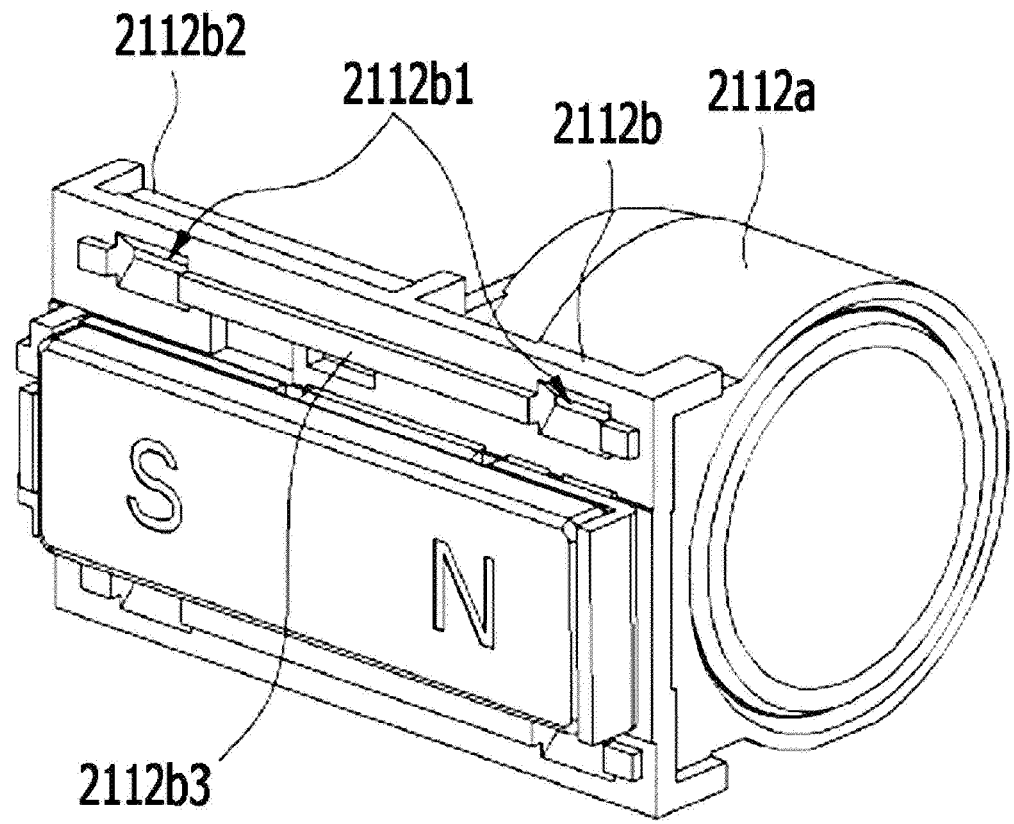

[FIG. 12]
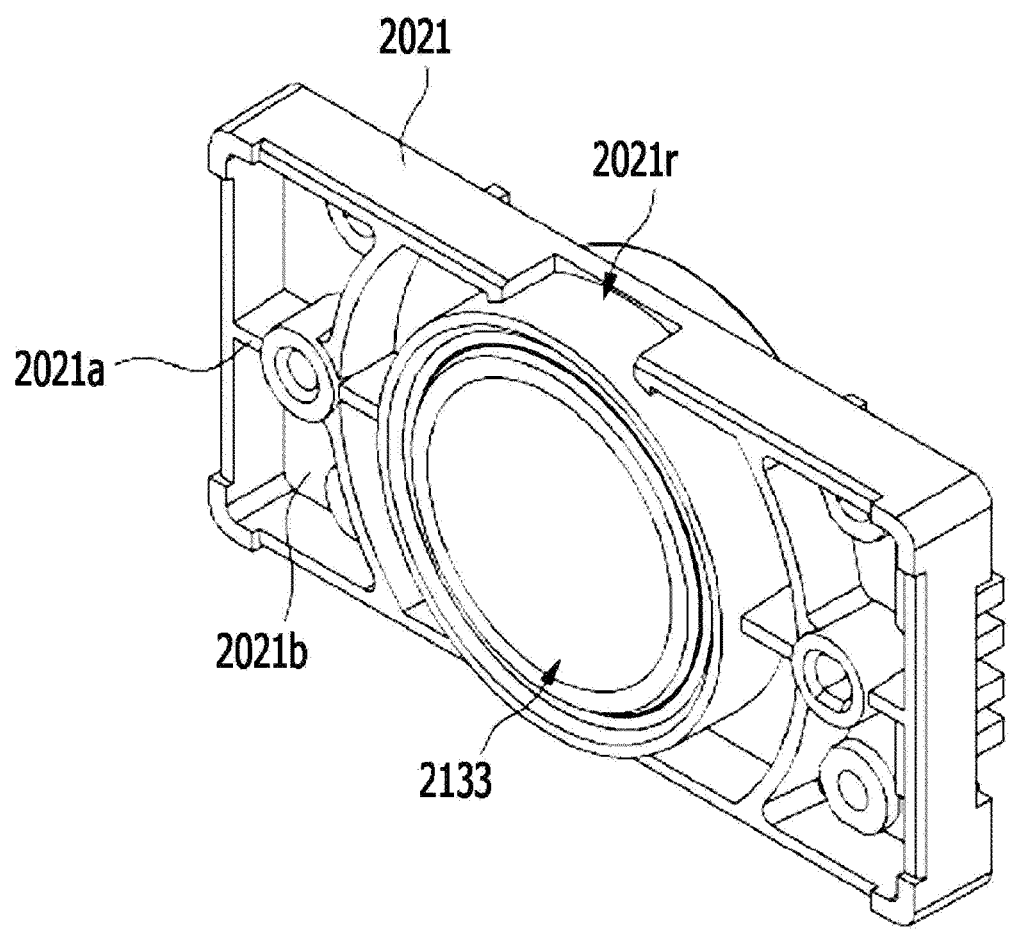

[FIG. 13]
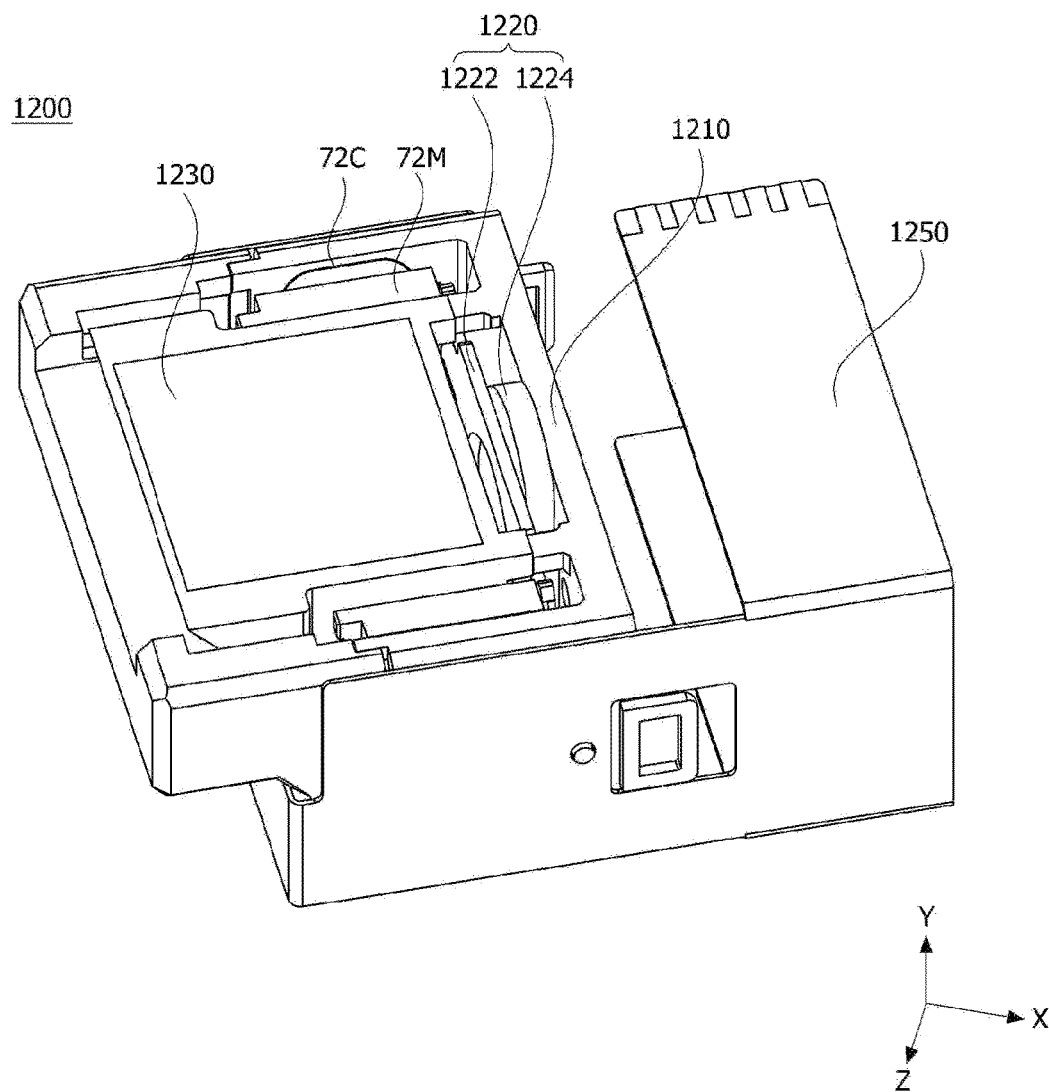

[FIG. 14]
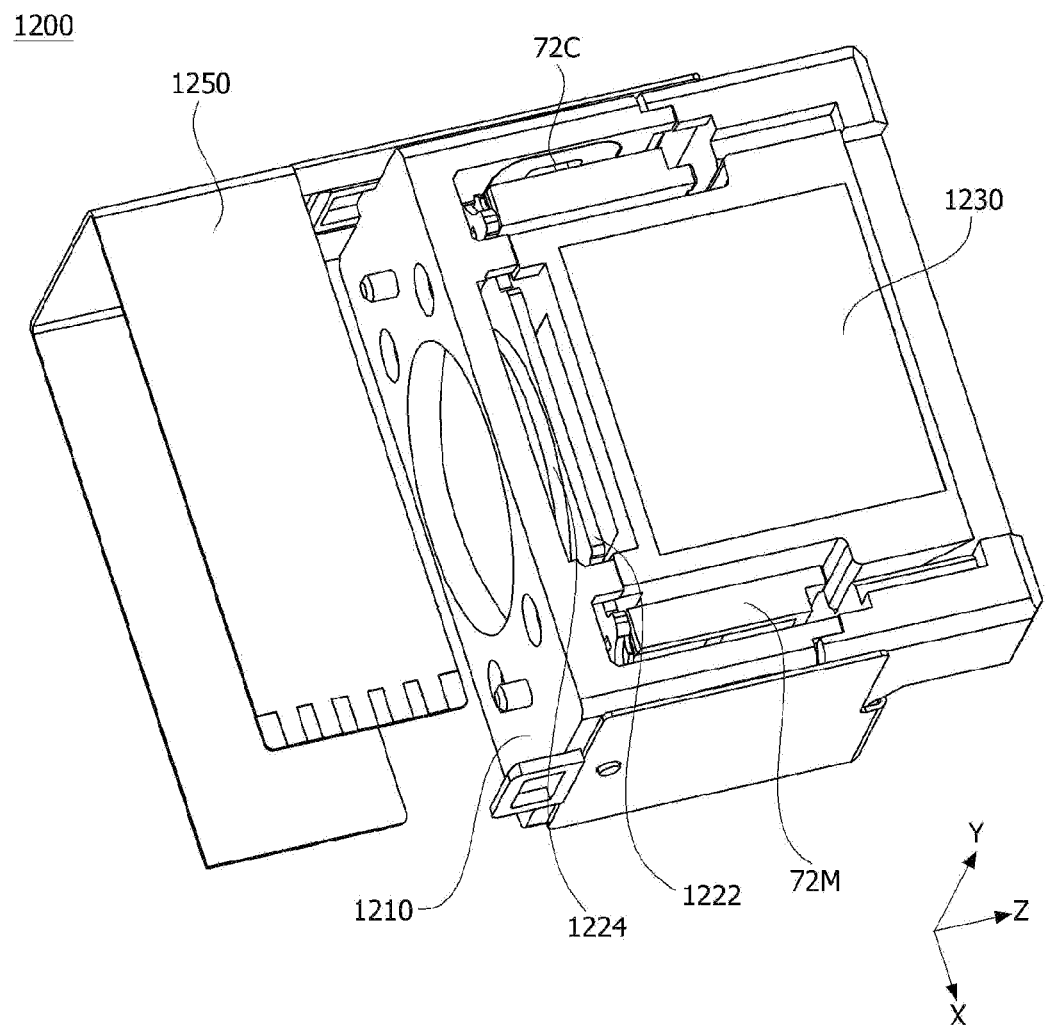

[FIG. 15]
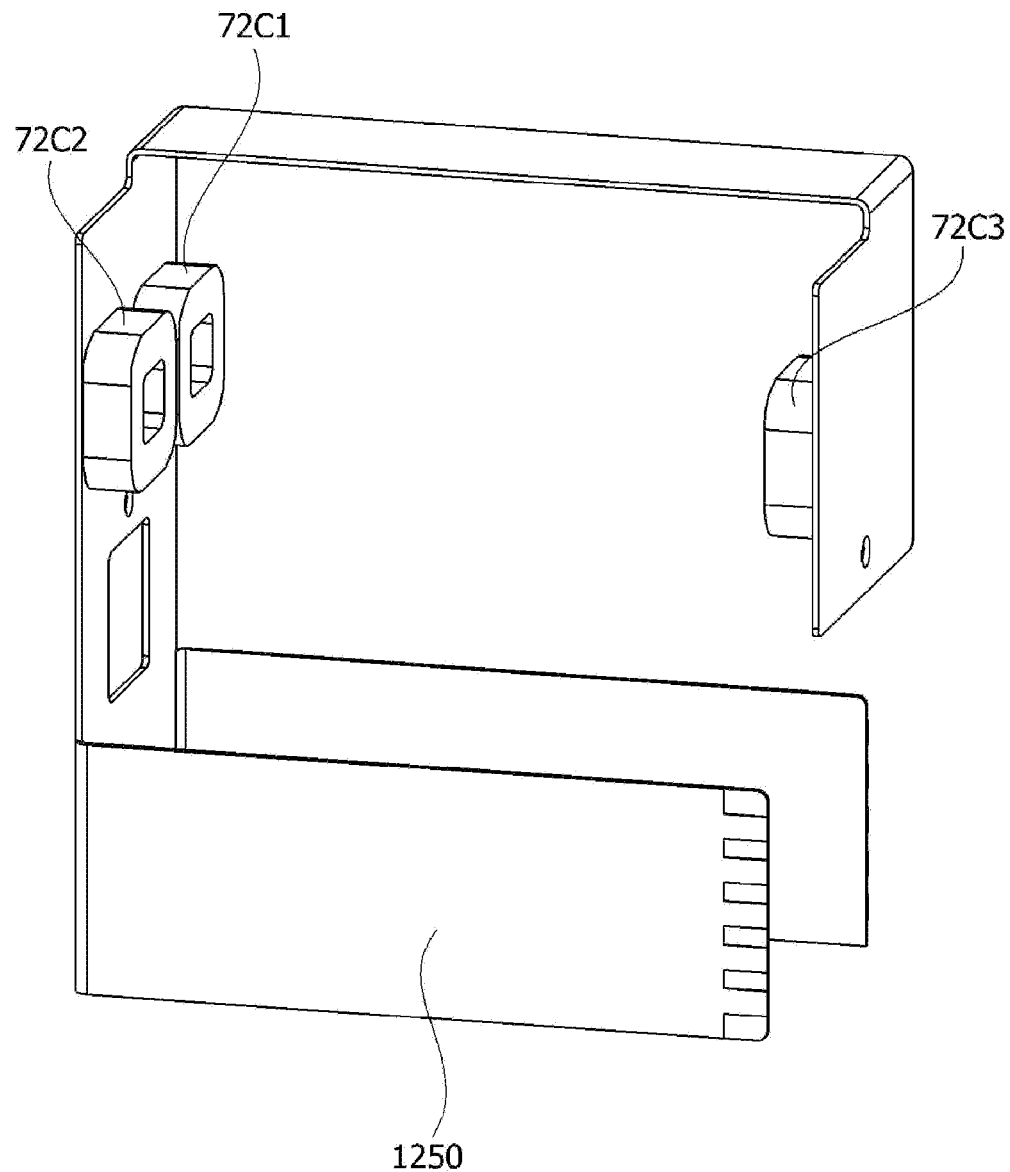

[FIG. 16]
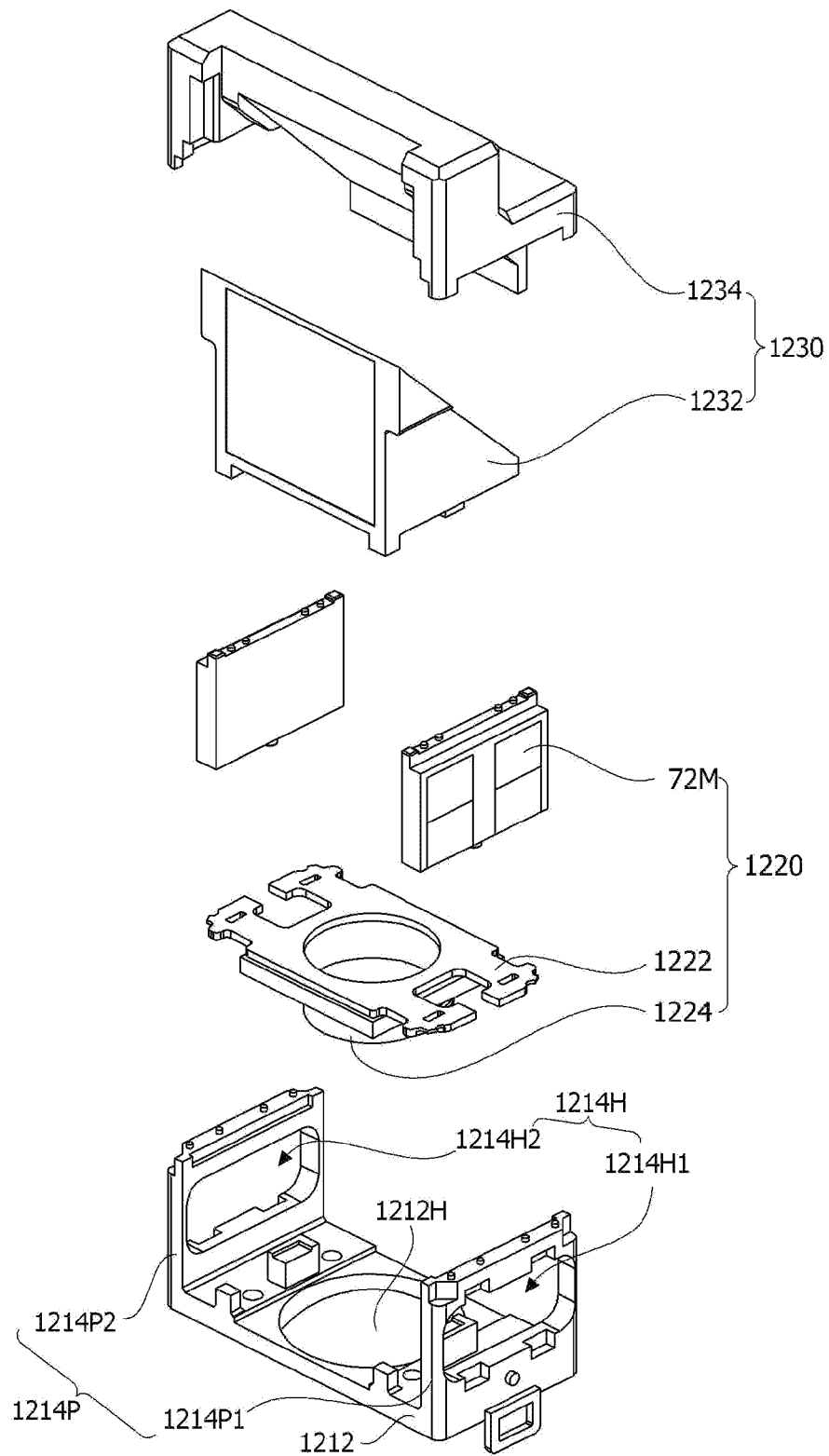

[FIG. 17]
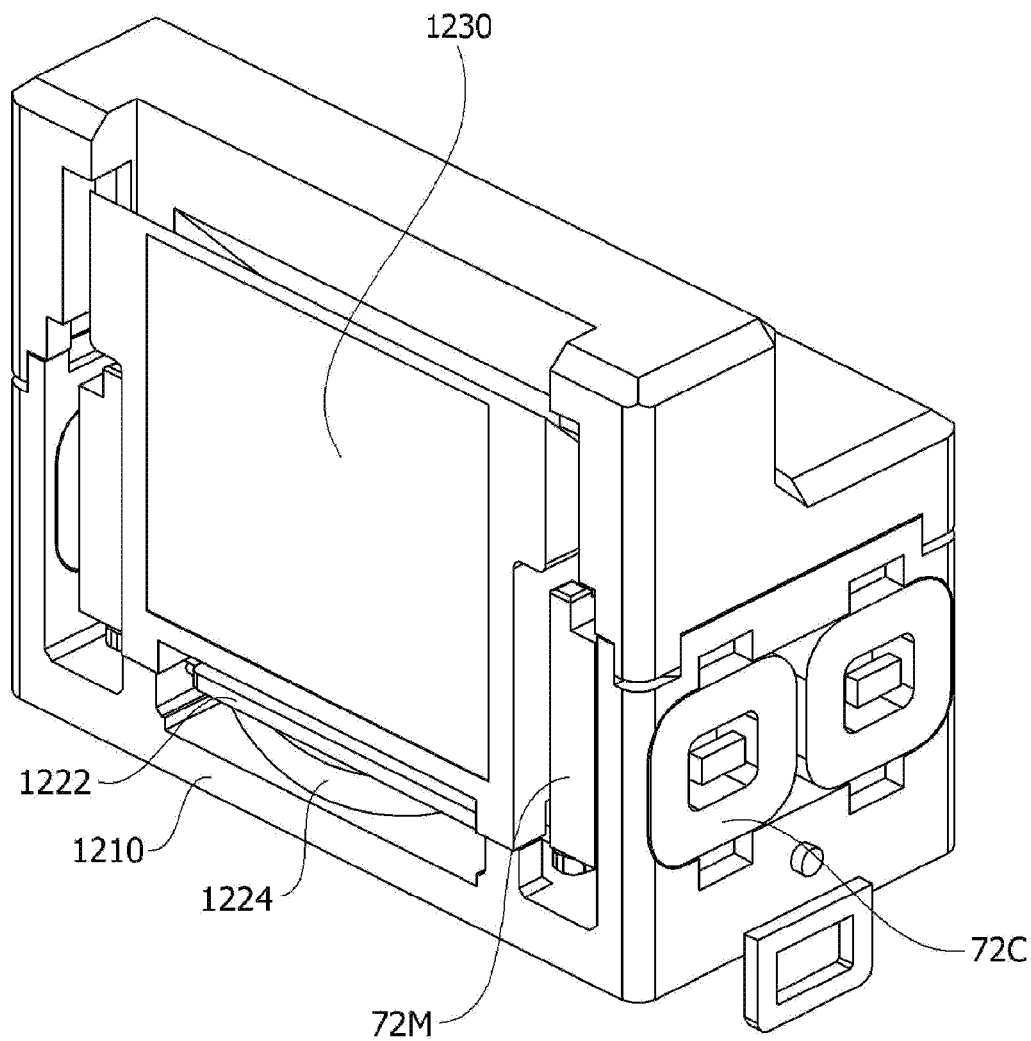

[FIG. 18]
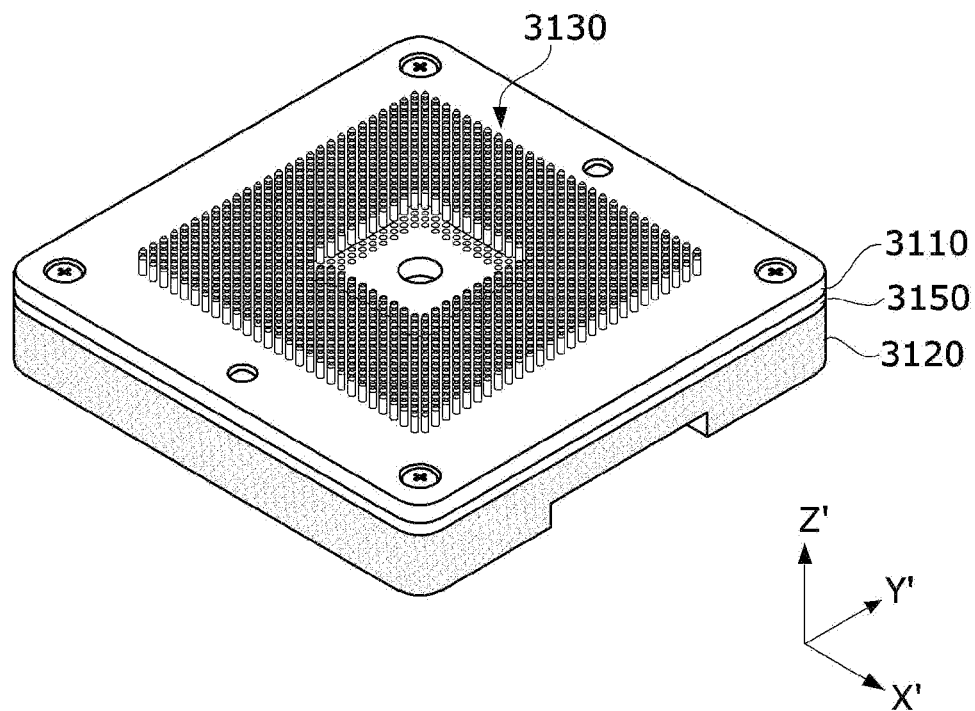

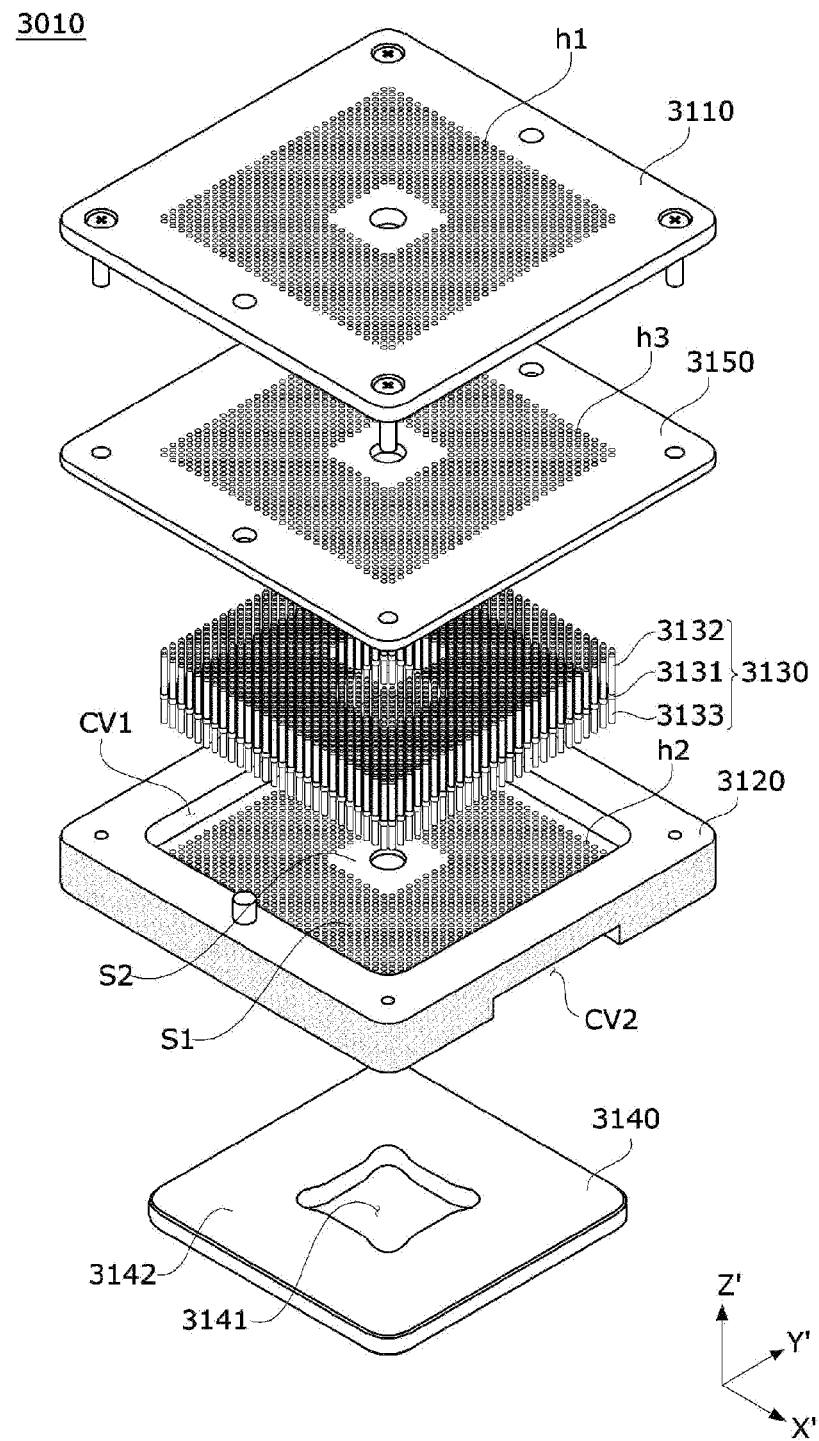
[FIG. 19]

[FIG. 20]
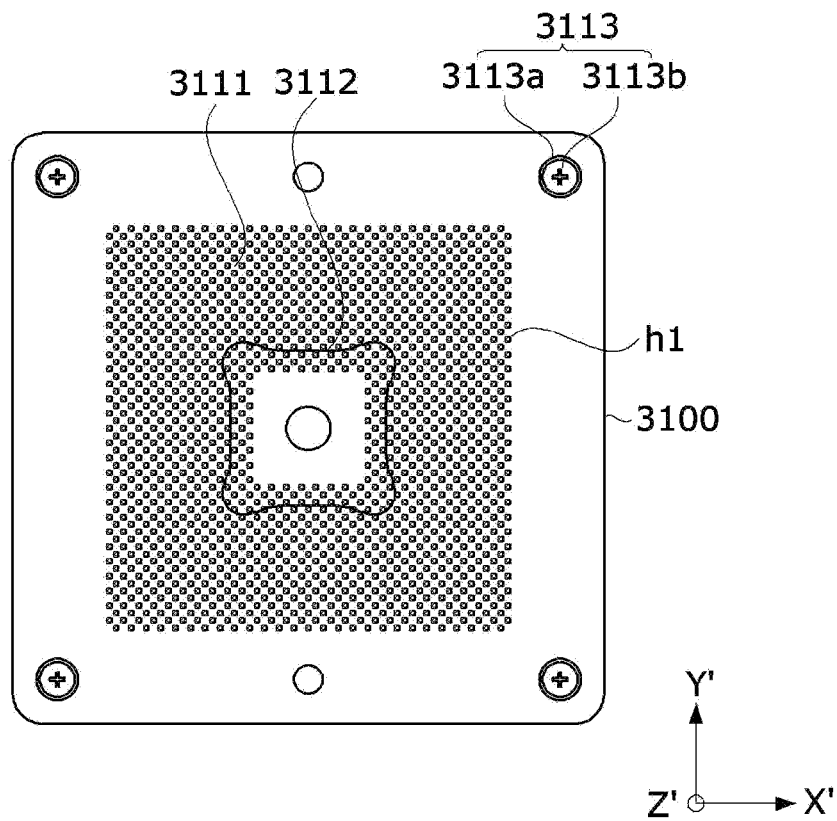
[FIG. 21]
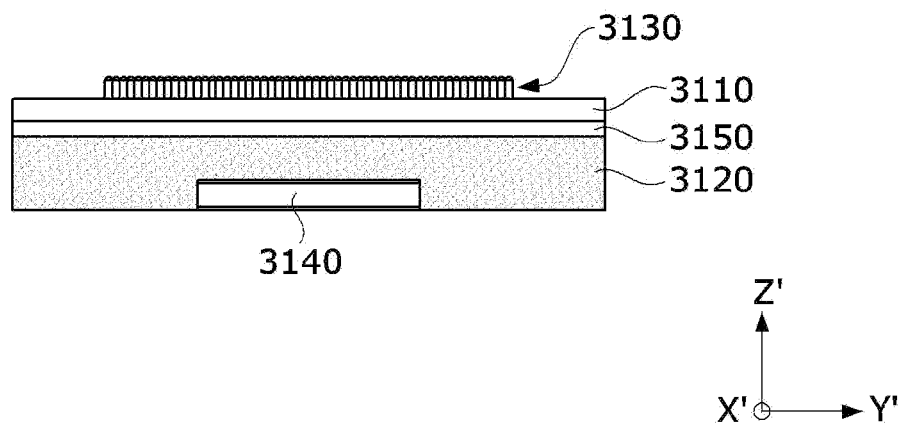

[FIG. 22]
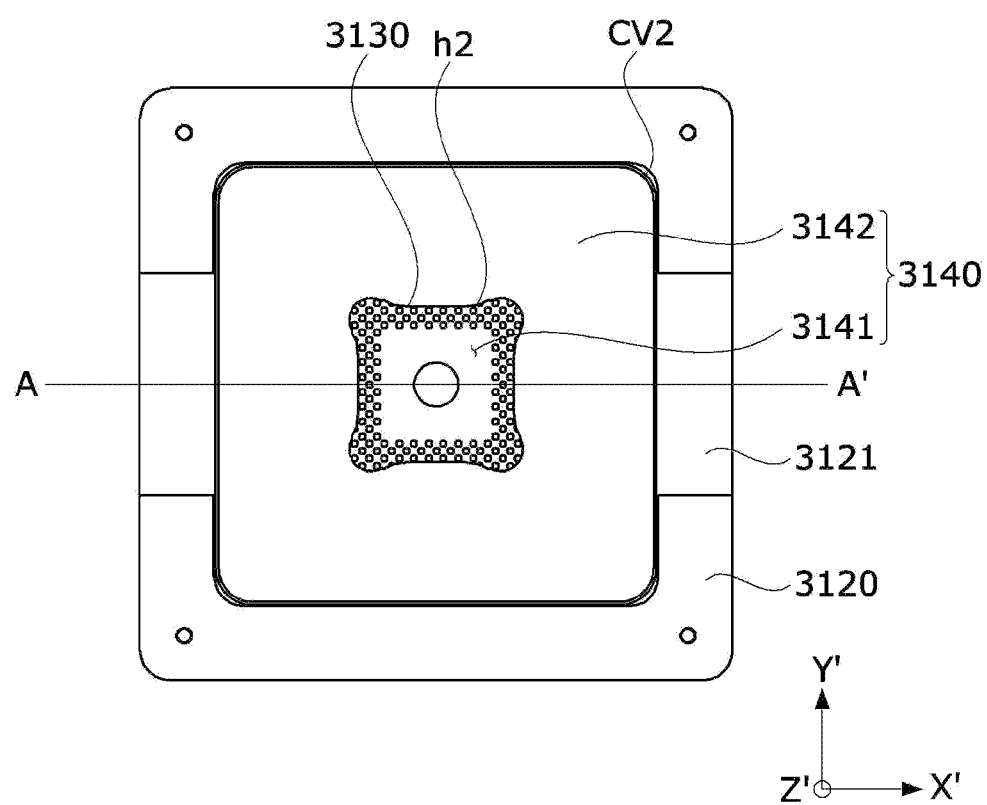

[FIG. 23]
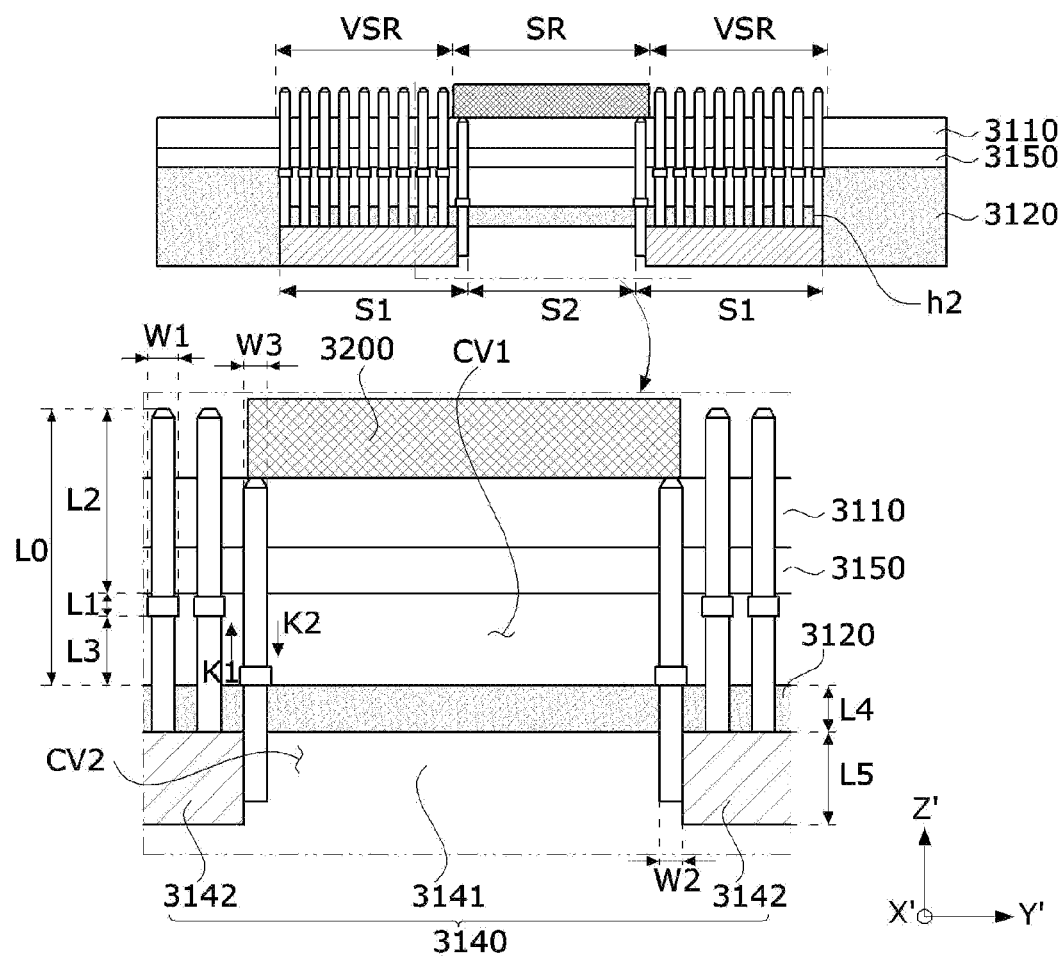

[FIG. 24a]
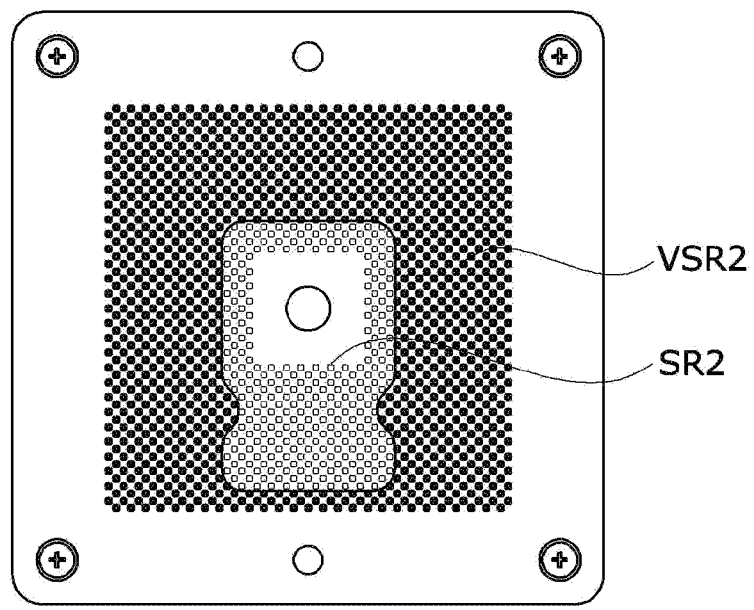
[FIG. 24b]
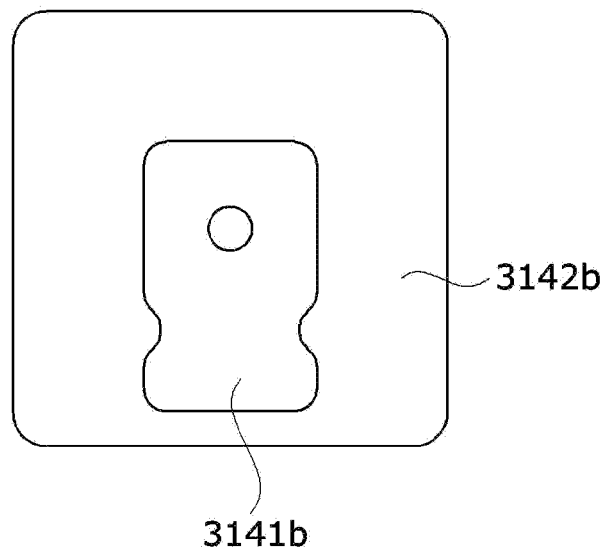

[FIG. 25a]
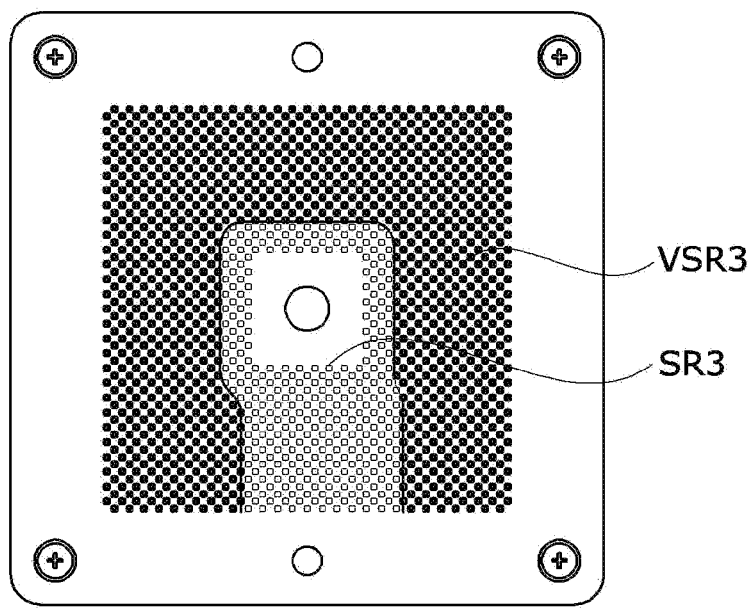
[FIG. 25b]
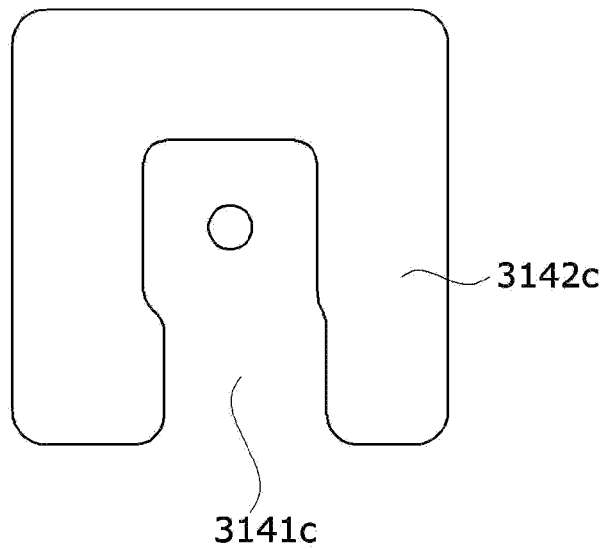

[FIG. 26]
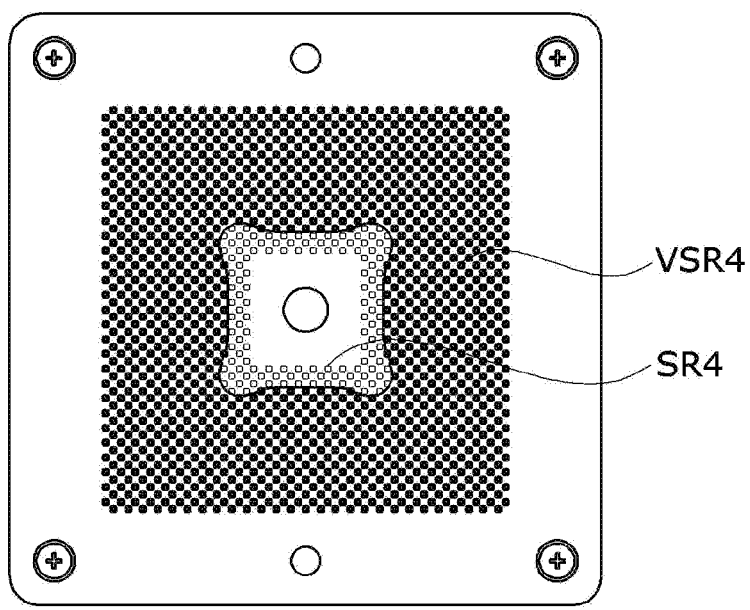
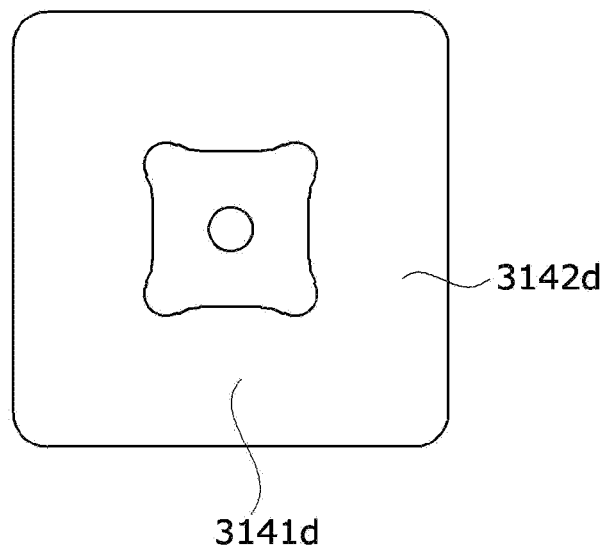

[FIG. 27]
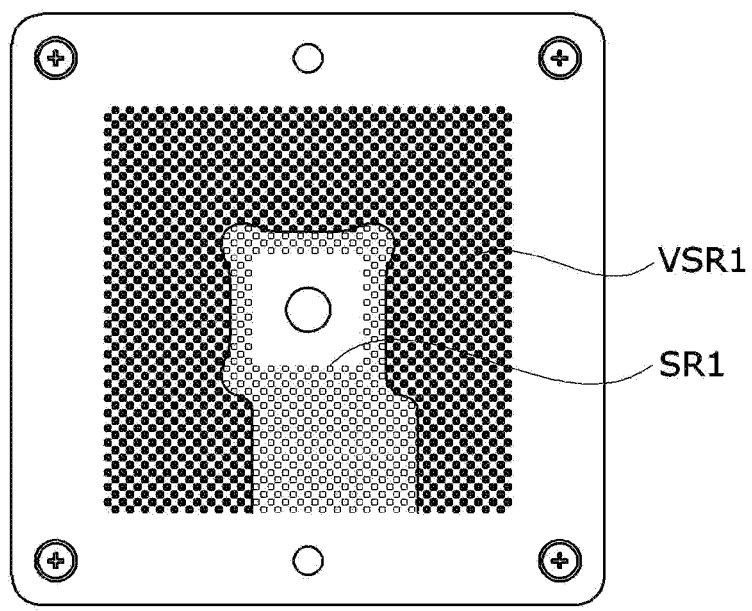
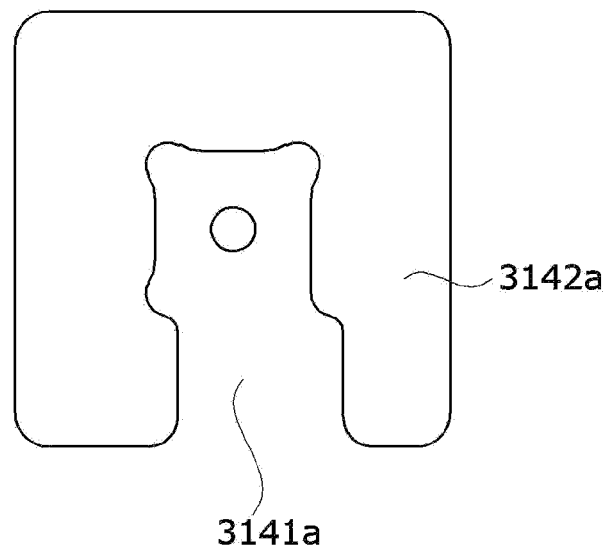

[FIG. 28]
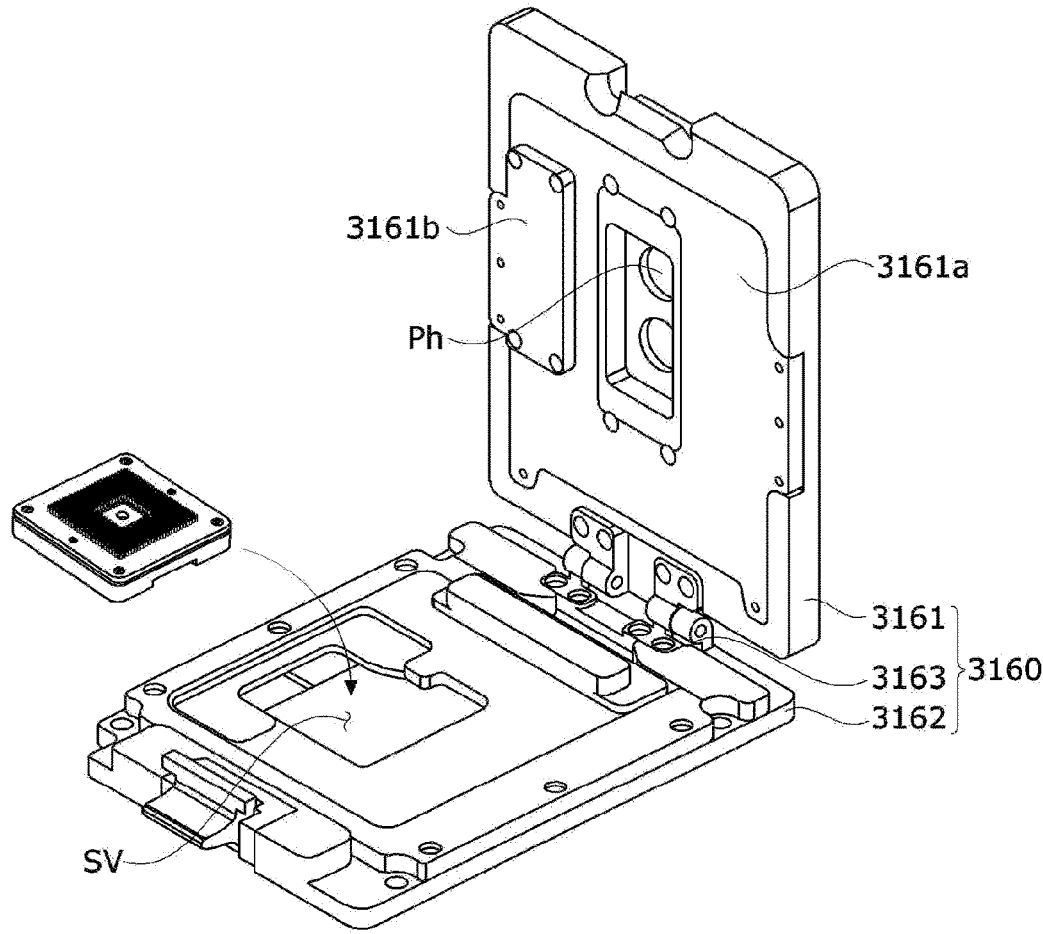
[FIG. 29]
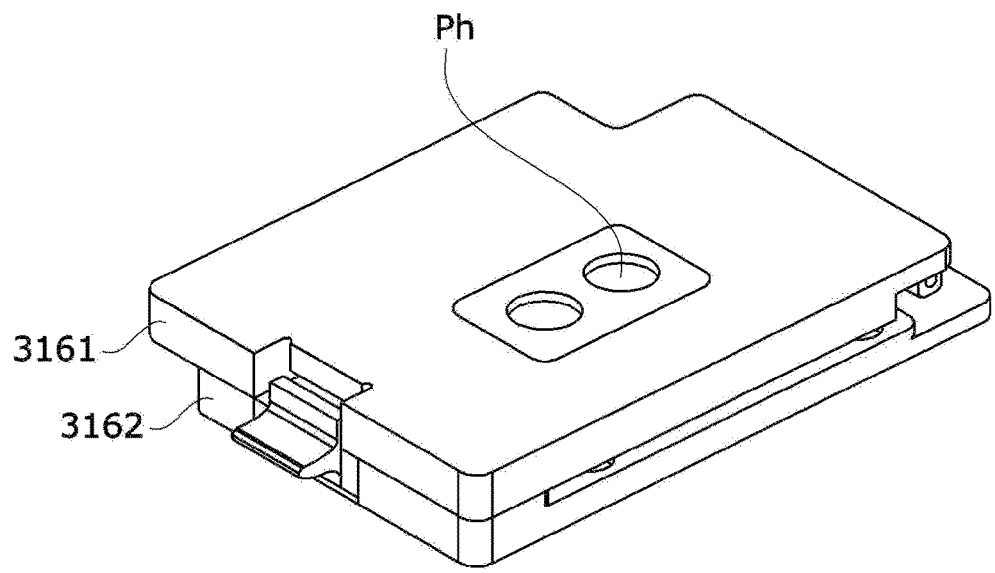

[FIG. 30]
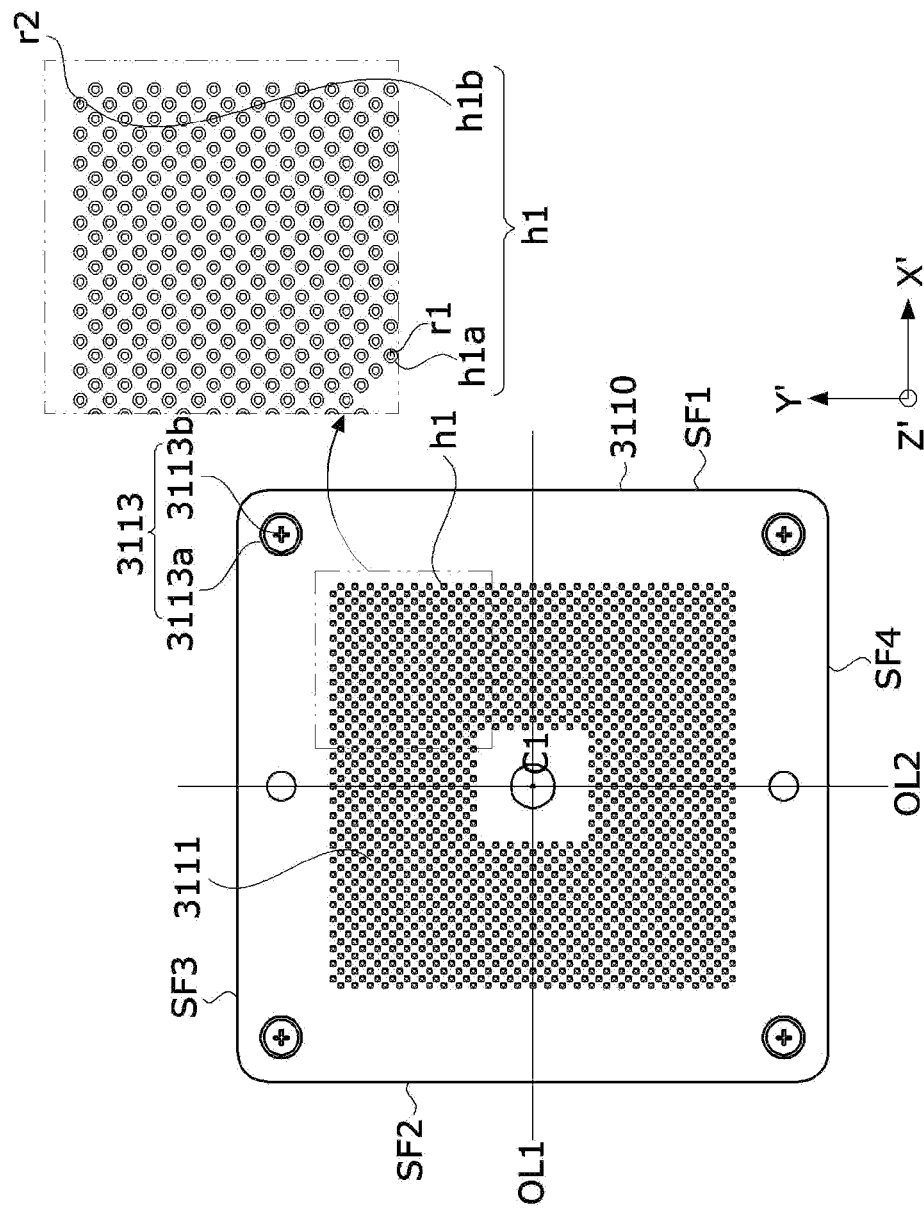

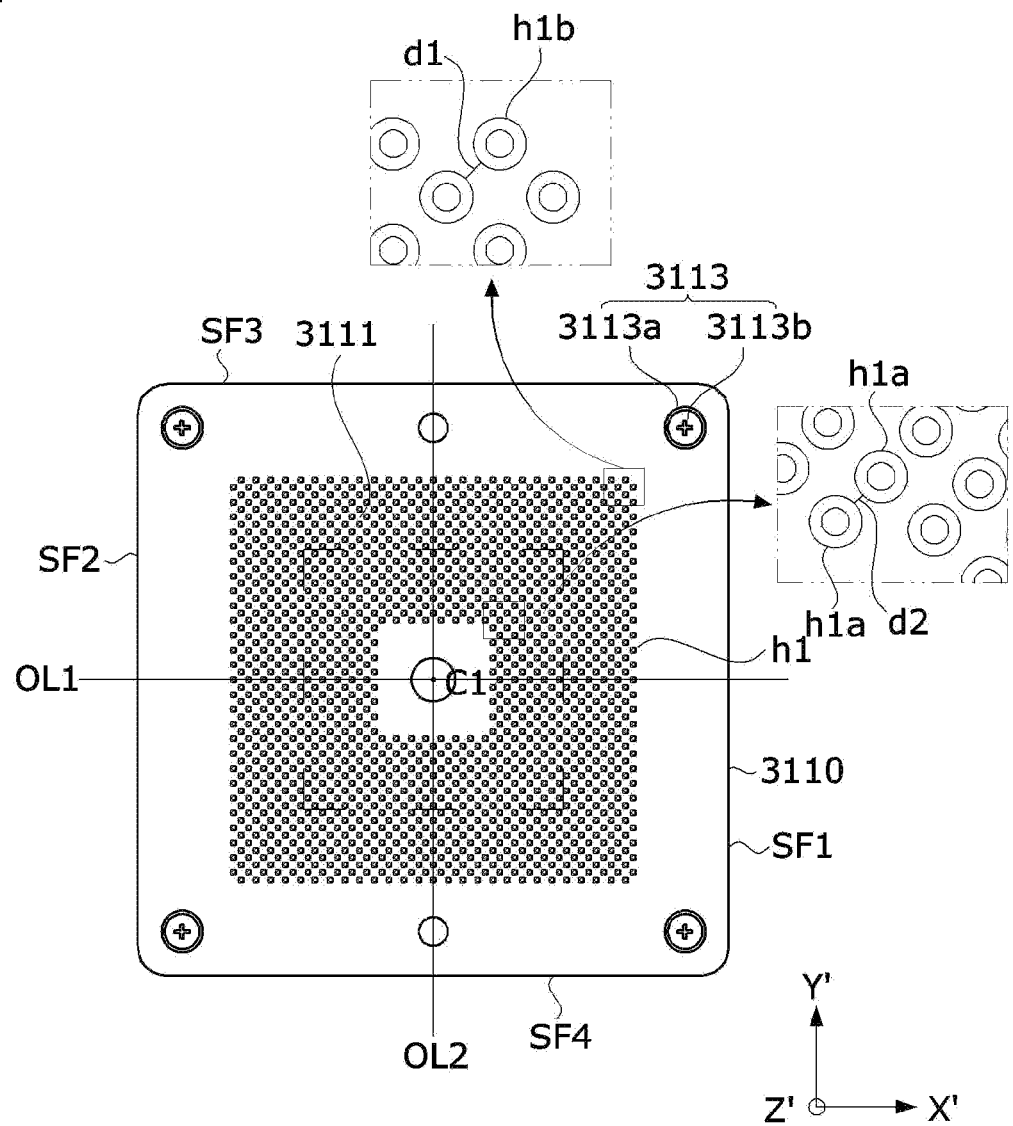
[FIG. 31]

[FIG. 32]
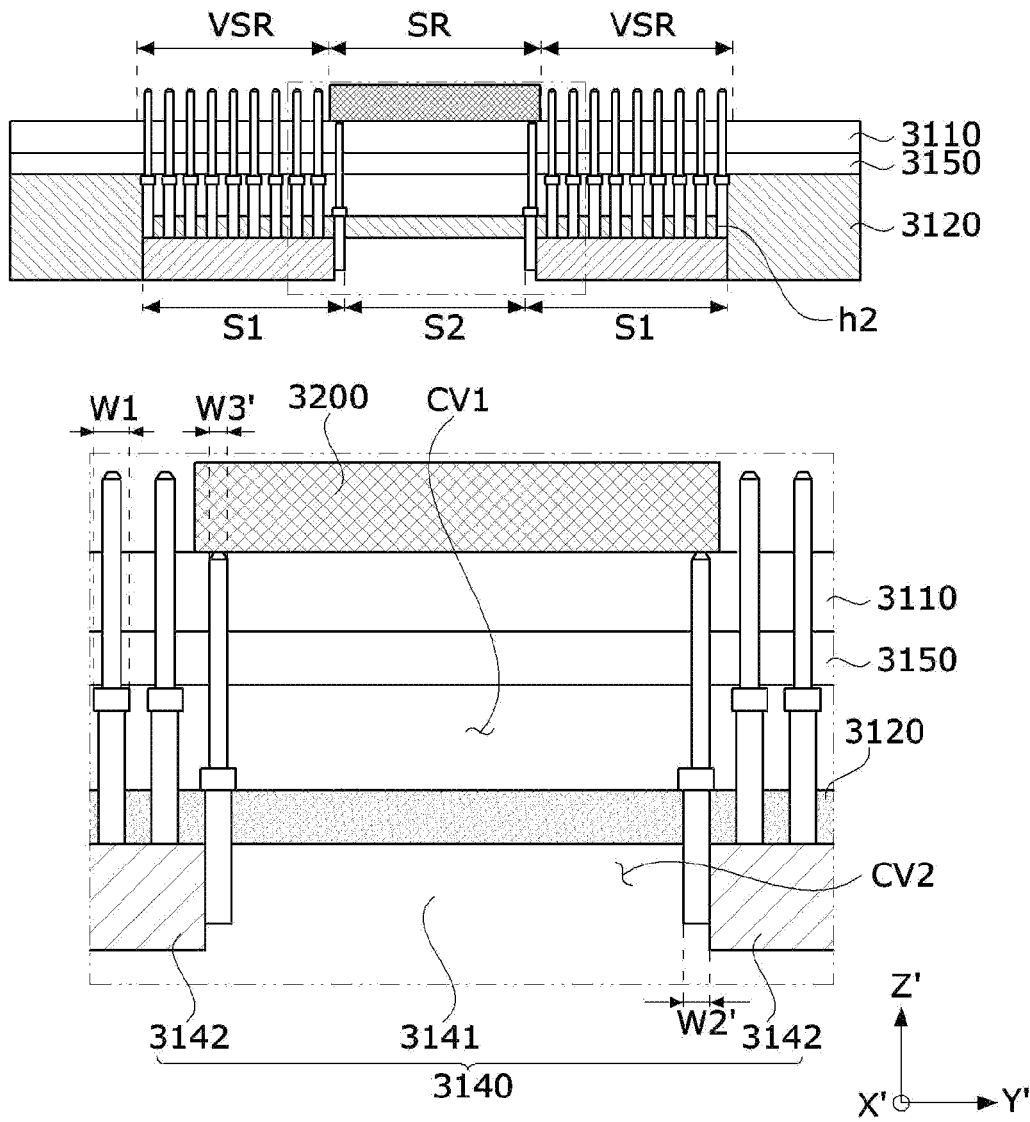

CAMERA ACTUATOR AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2020/013736, filed Oct. 8, 2020, which claims priority to Korean Patent Application Nos. 10-2019-0125393, filed Oct. 10, 2019 and 10-2019-0127907, filed Oct. 15, 2019, whose entire disclosures are hereby incorporated by reference.

TECHNICAL FIELD

The present invention relates to a camera actuator and a camera module including the same.

BACKGROUND ART

Cameras are devices that capture an image or a video of a subject and are mounted on portable devices, drones, vehicles, or the like. The camera device may have an image stabilization (IS) function for correcting or preventing image shake caused by user movement to improve image quality, an auto focusing (AF) function for automatically adjusting an interval between an image sensor and a lens to adjust a focal length of a lens, and a zooming function for increasing or decreasing a magnification of a subject at a long distance through a zoom lens to photograph the subject.

Meanwhile, in a camera module, a zoom actuator is used for a zooming function, frictional torque is generated when a lens moves due to mechanical movement of an actuator, and technical problems such as a decrease in driving force, an increase in power consumption, or the degradation of control characteristics are caused by the frictional torque.

In particular, in order to obtain the best optical characteristics using a plurality of zoom lens groups in a camera module, alignment between the plurality of lens groups and the alignment between the plurality of lens groups and an image sensor should be well made. When decentering occurs in which a center of a spherical surface between the lens groups deviates from an optical axis, a tilting phenomenon occurs in which a lens is tilted, or a phenomenon occurs in which central axes of the lens groups and the image sensor are not aligned, an angle of view changes or defocusing occurs, which adversely affects image quality or resolution.

Meanwhile, when a separation distance is increased in a movement area in order to reduce frictional torque generated when a lens moves for a zooming function in a camera module, there is a problem in that a probability of occurrence of decentering or tilting increases.

DISCLOSURE

Technical Problem

The present invention is directed to providing a camera actuator applicable to an ultra-slim, ultra-miniature, and high-resolution camera, and a camera device including the same.

The present invention is directed to providing a camera actuator capable of precisely performing zooming and auto focusing (AF) while alignment between lens groups is maintained, and a camera device including the same.

Technical Solution

According to an embodiment of the present invention, a camera module includes a lens group, a lens support unit configured to accommodate the lens group, a magnet disposed on an outer surface of the lens support unit, a yoke part that is disposed apart from and faces the magnet, and a coil disposed on the yoke part to face and be spaced apart from the magnet between the magnet and the yoke part, wherein all the lens group, the lens support unit, and the magnet move along an optical axis according to a current applied to the coil, the yoke part includes a first yoke and a second yoke disposed on the first yoke, the second yoke is disposed between the first yoke and the coil, and magnetism of the first yoke is stronger than magnetism of the second yoke.

Permeability of the first yoke may be 1,000 times or more permeability of the second yoke.

The first yoke may include a ferritic metal, and the second yoke may include an austenitic metal.

The second yoke may have a thickness of 10 μm or more and 100 μm or less.

An attractive force may act between the magnet and the yoke part, and a repulsive force may act between the first yoke and the second yoke.

A width of the second yoke may be greater than a width of the first yoke.

A thickness of the first yoke may be different from a thickness of the second yoke.

The camera module may further include a base and a pin coupled to the base, wherein the lens support unit moves along the pin.

The camera module may further include a sensor disposed in the coil and configured to detect a distance by which the lens group, the lens support unit, and the magnet move.

The camera module may further include a base, a guide part disposed at one side of the base, and a ball disposed between the guide part and the lens support unit, wherein the lens support unit moves along the ball.

The camera module may have at least one of an auto focusing (AF) function and a zooming function.

The camera module may further include a printed circuit board disposed between the second yoke and the coil.

All thicknesses of the first yoke, the second yoke, and the printed circuit board may be the same.

At least one of the thicknesses of the first yoke, the second yoke, and the printed circuit board may be different.

According to an embodiment of the present invention, a socket for a test device includes a first plate, a second plate having a first cavity and a second cavity disposed to face the first cavity, a plurality of pins disposed in the first cavity between the first plate and the second plate, and a shape frame disposed in the second cavity, wherein the plurality of pins pass through the first plate in a first direction to correspond to the shape frame, and the first direction is a direction from the first plate toward the second plate.

The shape frame may include an opening area and a non-opening area, and the plurality of pins may pass through the first plate in the open area and may pass through the second plate in the non-opening area.

The first plate may include a non-seating portion overlapping the opening area in the first direction and a seating portion overlapping the non-opening area in the first direction to accommodate a test object.

The non-seating portion and the seating portion may vary according to the shape frame.

The first plate may include a plurality of first holes, the second plate may include a plurality of second holes, and the plurality of pins overlap the first holes and the second holes in the first direction.

The plurality of second holes may be positioned inside the first cavity.

The first cavity may include a first area in which the plurality of pins are disposed and a second area disposed inside the first area, wherein the second area does not overlap the plurality of first holes and the plurality of second holes in the first direction.

The plurality of pins may pass through at least one of the plurality of first holes and the plurality of second holes.

The plurality of pins may each include a body portion, a first extension portion extending from the body portion toward the first plate, and a second extension portion extending from the body portion toward the second plate.

A length of the first extension portion in a second direction may be the same as a length of the second extension portion in the second direction, and the second direction may be a direction perpendicular to the first direction.

The first extension portion and the second extension portion may have different lengths in the first direction.

The first extension portion may pass through the first hole, and the second extension portion may pass through the second hole.

The socket may further include a third plate disposed between the first plate and the second plate and including a plurality of third holes.

The plurality of third holes may overlap the plurality of first holes and the plurality of second holes in the first direction.

The plurality of pins may include a first pin disposed at an inner side and a second pin disposed at an outer side, wherein the first pin and the second pin have different diameters.

Advantageous Effects

According to embodiments of the present invention, it is possible to obtain a camera actuator applicable to an ultra-slim, ultra-miniature, and high-resolution camera, and a camera device including the same. In addition, it is possible to obtain a camera actuator capable of precisely performing zooming and auto focusing (AF) while alignment between lens groups is maintained, and a camera device including the same.

DESCRIPTION OF DRAWINGS

FIG. 1 is a perspective view illustrating an example of a camera device.

FIG. 2a is a perspective view illustrating the camera shown in FIG. 1 from which a shield can is removed.

FIG. 2b is a plan view of the camera shown in FIG. 2a.

FIG. 3a is a perspective view of a first camera module shown in FIG. 2a.

FIG. 3b is a side cross-sectional view of the first camera module shown in FIG. 3a.

FIG. 4 is a perspective view of a first actuator according to an embodiment of the present invention.

FIG. 5 is a perspective view of a part of the first actuator according to the embodiment of the present invention.

FIG. 6 is a schematic cross-sectional view of a driving unit according to an embodiment of the present invention.

FIG. 7 is a schematic cross-sectional view of a driving unit according to another embodiment of the present invention.

FIG. 8 is a perspective view of an actuator for auto focusing (AF) or zooming according to another embodiment of the present invention.

FIG. 9 is a perspective view illustrating the actuator according to the embodiment shown in FIG. 8 from which some components are omitted.

FIG. 10 is an exploded perspective view illustrating the actuator according to the embodiment shown in FIG. 8 from which some components are omitted.

FIG. 11a is a perspective view of a first lens assembly (2110) in the actuator according to the embodiment shown in FIG. 10.

FIG. 11b is a perspective view illustrating the first lens assembly (2110) shown in FIG. 11a from which some components are removed.

FIG. 12 is a perspective view of a third lens assembly (2130) in the actuator according to the embodiment shown in FIG. 10.

FIG. 13 is a perspective view of a second actuator of the camera device shown in FIGS. 1 to 3 in one direction.

FIG. 14 is a perspective view of the second actuator of FIG. 13 in another direction.

FIG. 15 is a perspective view of a second circuit board and a driving unit of the second actuator of FIG. 12.

FIG. 16 is a partially exploded perspective view of the second actuator of FIG. 13.

FIG. 17 is a perspective view illustrating the second actuator of FIG. 13 from which the second circuit board is removed.

FIG. 18 is a perspective view of a socket for a test device according an embodiment of the present invention.

FIG. 19 is an exploded perspective view of the socket for a test device according to the embodiment of the present invention.

FIG. 20 is a top view of the socket for a test device according to the embodiment of the present invention.

FIG. 21 is a side view of the socket for a test device according to the embodiment of the present invention.

FIG. 22 is a bottom view of the socket for a test device according to the embodiment of the present invention.

FIG. 23 is a cross-sectional view of the socket for a test device according to the embodiment of the present invention.

FIGS. 24a to 27 are views for describing a specific example of a socket for a test device according to an embodiment.

FIGS. 28 and 29 are views for describing a test using a socket for a test device according to an embodiment FIG. 30 shows views of a socket for a test device according to another embodiment of the present invention.

FIG. 31 shows views of a socket for a test device according to still another embodiment of the present invention.

FIG. 32 shows views of a socket for a test device according to a modified example.

MODES OF THE INVENTION

While the present invention is open to various modifications and alternative embodiments, specific embodiments thereof will be described and shown by way of example in the accompanying drawings. However, it should be understood that there is no intention to limit the present invention to the particular embodiments disclosed, and on the contrary, the present invention is to cover all modifications, equivalents, and alternatives falling within the spirit and scope of the present invention.

It should be understood that, although the terms including ordinal numbers such as first, second, and the like may be used herein to describe various elements, the elements are not limited by the term. These terms are only used for the purpose of distinguishing one element from another element. For example, without departing from the scope of the present invention, a second element could be termed a first element, and similarly a first element could be also termed a second element. The term "and/or" includes any one or all combinations of a plurality of associated listed items.

In the case that one component is described as being "connected" or "linked" to another component, it may be connected or linked to the corresponding component directly or other components may be present therebetween. On the other hand, in the case that one component is described as being "directly connected" or "directly linked" to another component, it should be understood that other components are not present therebetween.

It is to be understood that terms used herein are for the purpose of the description of particular embodiments and not for limitation. A singular expression includes a plural expression unless the context clearly indicates otherwise. It will further be understood that the terms "comprises" and/or "comprising," when used in this specification, specify the presence of stated features, integers, steps, operations, elements, components, and/or groups thereof but do not preclude the presence or addition of one or more other features, integers, steps, operations, elements, components, and/or groups thereof.

Unless defined otherwise, all the terms (including technical and scientific terms) used herein have the same meaning as commonly understood by one of ordinary skill in the art to which the present invention belongs. It will further be understood that the terms, such as those defined in commonly used dictionaries, should be interpreted as having meanings that are consistent with their meanings in the context of the relevant art and should not be interpreted in an idealized or overly formal sense unless expressly defined otherwise herein.

Hereinafter, embodiments will be described in detail with reference to the accompanying drawings, and the same or corresponding elements will be given the same reference numbers regardless of drawing symbols, and redundant descriptions will be omitted.

FIG. 1 is a perspective view illustrating an example of a camera device, FIG. 2a is a perspective view illustrating the camera shown in FIG. 1 from which a shield can is removed, and FIG. 2b is a plan view of the camera shown in FIG. 2a.

Referring to FIG. 1, a camera device 1000 may include one or more camera modules. For example, the camera device 1000 may include a first camera module 1000A and a second camera module 1000B. The first camera module 1000A and the second camera module 1000B may be covered by a certain shield can 1510.

Referring to FIGS. 1, 2a, and 2b together, the first camera module 1000A may include one or more actuators. For example, the first camera module 1000A may include a first actuator 1100 and a second actuator 1200.

The first actuator 1100 may be electrically connected to a circuit board 1410 of a first group, the second actuator 1200 may be electrically connected to a circuit board 1420 of a second group, and although not shown, the circuit board 1420 of the second group may be electrically connected to the circuit board 1410 of the first group. The second camera module 1000B may be electrically connected to a circuit board 1430 of a third group.

The first actuator 1100 may be a zoom actuator or an auto focusing (AF) actuator. For example, the first actuator 1100 may support one or more lenses and may move the lenses according to a control signal of a certain control unit to perform an AF function or a zooming function.

The second actuator 1200 may be an optical image stabilizer (OIS) actuator.

The second camera module 1000B may include a fixed focal length lens disposed in a certain barrel (not shown). The fixed focal length lens may be referred to as a "single focal length lens" or a "single lens."

The second camera module 1000B may be disposed in a certain housing (not shown) and may include an actuator (not shown) capable of driving a lens unit. The actuator may be a voice coil motor, a micro actuator, a silicon actuator, or the like and may be applied as various types such as a capacitive type, a thermal type, a bimorph type, and an electrostatic force type, but the present invention is not limited thereto.

Next, FIG. 3a is a perspective view of the first camera module shown in FIG. 2a, and FIG. 3b is a side cross-sectional view of the first camera module shown in FIG. 3a.

Referring to FIG. 3a, the first camera module 1000A may include the first actuator 1100 configured to perform a zooming function and an AF function and the second actuator 1200 disposed at one side of the first actuator 1100 and configured to perform an OIS function.

Referring to FIG. 3b, the first actuator 1100 may include an optical system and a lens driving unit. For example, at least one of a first lens assembly 1110, a second lens assembly 1120, a third lens assembly 1130, and a guide pin 50 may be disposed in the first actuator 1100.

In addition, the first actuator 1100 may include a coil driving unit 1140 and a magnet driving unit 1160 to perform a high-magnification zooming function.

For example, the first lens assembly 1110 and the second lens assembly 1120 may be moving lenses which are moved through the coil driving unit 1140, the magnet driving unit 1160, and the guide pin 50, and the third lens assembly 1130 may be a fixed lens, but the present invention is not limited thereto. For example, the third lens assembly 1130 may perform a function of a focator for forming an image of light at a specific position, and the first lens assembly 1110 may perform a function of a variator for re-forming the image formed by the third lens assembly 1130, which is the focator, at a different position. Meanwhile, in the first lens assembly 1110, due to many changes in distance to a subject or an image distance, a change in magnification may be large, and the first lens assembly 1110 that is the variator may play an important role in a change in focal length or magnification of an optical system. Meanwhile, an image point, at which an image is formed by the first lens assembly 1110 that is the variator, may be slightly different according to positions. Accordingly, the second lens assembly 1120 may perform a function of compensating a position of an image formed by the variator. For example, the second lens assembly 1120 may perform a function of a compensator for accurately forming an image point, at which an image is formed by the first lens assembly 1110 that is the variator, at an actual position of an image sensor 1190.

For example, the first lens assembly 1110 and the second lens assembly 1120 may be driven by an electromagnetic force generated by an interaction between the coil driving unit 1140 and the magnet driving unit 1160. That is, the magnet driving unit 1160 may be fixed to at least one of the first lens assembly 1110 and the second lens assembly 1120 to move together with at least one of the first lens assembly 1110 and the second lens assembly 1120. This may vary according to at least one of a movement direction and a movement distance of at least one of the first lens assembly 1110 and the second lens assembly 1120. To this end, a Hall sensor may be disposed in the coil driving unit 1140 and may detect a position of the magnet driving unit 1160 that moves together with at least one of the first lens assembly 1110 and the second lens assembly 1120.

The certain image sensor 1190 may be disposed perpendicular to an optical axis direction of parallel light.

Next, the second actuator 1200 may include a shake correction unit 1220 disposed in a housing and a prism unit 1230 disposed on the shake correction unit 1220. The shake correction unit 1220 may include a shaper member 1222 and a lens member 1224 and may include a magnet driving unit 72M and a coil driving unit 72C. Here, the lens member 1224 may be used interchangeably with a liquid lens, a fluid lens, a variable prism, or the like. A shape of the lens member 1224 may be reversibly deformed by pressure applied to a surface of the lens member 1224, thereby changing an optical path of light passing through the lens member 1224. For example, the lens member 1224 may include a fluid surrounded by an elastic membrane. The shaper member 1222 may be combined with, connected to, or in direct contact with the lens member 1224, and pressure may be applied to the lens member 1224 due to movement of the shaper member 1222. Thus, the shape of the lens member 1224 may be reversibly deformed, thereby changing an optical path of light passing through the lens member 1224. As will be described below, the movement of the shaper member 1222 may occur due to an interaction between the magnet driving unit 72M and the coil driving unit 72C.

As described above, an OIS can be implemented by controlling an optical path of light passing through the lens member 1224, thereby minimizing the occurrence of a decentering or tilting phenomenon and providing superior optical characteristics.

Since FIGS. 1 to 3 and descriptions with reference thereto are provided for the purpose of describing the overall structure and operation principle of the camera device according to the embodiment of the present invention, embodiments of the present invention are not limited to the detailed configuration shown in FIGS. 1 to 3.

Hereinafter, a first actuator for implementing a zooming function and an AF function according to embodiments of the present invention will be described in more detail.

FIG. 4 is a perspective view of the first actuator according to an embodiment of the present invention. Here, an axis refers to an optical axis direction or a direction parallel thereto. For reference, according to FIG. 3B, although the first actuator 1100 for implementing a zooming function and an AF function is illustrated as including the first lens assembly 1110, the second lens assembly 1120, and the third lens assembly 1130, since embodiments of the present invention mainly relate to the structures of the first lens assembly 1110 and the second lens assembly 1120 which are the moving lenses, the illustration and description of the third lens assembly 1130, which is the fixed lens, will be omitted below.

Referring to FIG. 4, the first actuator 1100 includes a base (not shown), the first lens assembly 1110, the second lens assembly 1120, and the third lens assembly (not shown).

The first lens assembly 1110 and the second lens assembly 1120 are disposed in the base (not shown), and the first lens assembly 1110 includes a first lens group 100 and a first lens support unit 110. The first lens group 100 may be accommodated in the first lens support unit 110 and may be fixed to the first lens support unit 110. The second lens assembly 1120 includes a second lens group [200] and a second lens support unit 210. The second lens group [200] may be accommodated in the second lens support unit 210 and fixed to the second lens support unit 210.

The first lens assembly 1110 and the second lens assembly 1120 are disposed along a Z-axis, and the first actuator 1100 further includes a first driving unit 300 and a second driving unit 400. The first driving unit 300 and the second driving unit 400 are disposed symmetrically with each other at both sides of the first lens assembly 1110 and the second lens assembly 1120. For example, the first driving unit 300 may move the first lens assembly 1110, and the second driving unit 400 may move the second lens assembly 1120. To this end, the first driving unit 300 may include a first magnet driving unit 310 which is disposed on an outer surface of the first lens support unit 110 of the first lens assembly 1110 and moves together with the first lens support unit 110 and a first coil driving unit 320 which is disposed apart from and faces the first magnet driving unit 310, is connected to a circuit board (not shown), and is fixed to the base (not shown) or the like. The second driving unit 400 may include a second magnet driving unit 410 which is disposed on an outer surface of the second lens support unit 210 of the second lens assembly 1120 and moves together with the second lens support unit 210 and a second coil driving unit 420 which is disposed apart from and faces the second magnet driving unit 410, is connected to a circuit board (not shown), and is fixed to the base (not shown) or the like. Here, the first magnet driving unit 310 and the second magnet driving unit 410 may be the magnet driving unit 1160 of FIG. 3B, and the first coil driving unit 320 and the second coil driving unit 420 may be the coil driving unit 1140 of FIG. 3B. Here, the first magnet driving unit 310 and the second magnet driving unit 410 may be disposed directly on the first lens support unit 110 and the second lens support unit 210, respectively. The first magnet driving unit 310 and the first coil driving unit 320 may electromagnetically interact with each other by a current applied to the first coil driving unit 320, and thus, the first magnet driving unit 310 may move together with the first lens support unit 110. Similarly, the second magnet driving unit 410 and the second coil driving unit 420 may electromagnetically interact with each other by a current applied to the second coil driving unit 420, and thus, the second magnet driving unit 410 may move together with the second lens support unit 210.

In this case, the first lens support unit 110 and the second lens support unit 210 may move along pins 50 fixed to the base (not shown) or the like in advance. Here, the base or the like may refer to a member for accommodating the first lens support unit 110 and the second lens support unit 210. Accordingly, the pins 50 can guide movement of the first lens support unit 110 and the second lens support unit 210, thereby preventing decentering in which a spherical center between lens groups deviates from an optical axis, a phenomenon in which a lens is tilted, and a phenomenon in which central axes of the lens group and an image sensor are not aligned.

More specifically, the pins 50 may include a first pin 51 and a second pin 52 which are spaced apart from each other in parallel to an optical axis. In the present specification, the pin 50 may be used interchangeably with a rod or a shaft.

The pin 50 may be made of at least one selected from among of plastic, a glass-based epoxy, polycarbonate, a metal, and a composite material.

Meanwhile, the first lens support unit 110 and the second lens support unit 210 may include areas for fixing the first lens group 100 and the second lens group [200] and areas for supporting the first magnet driving unit 310 and the second magnet driving unit 410, respectively. Hereinafter, the area for fixing the lens group will be referred to as a lens housing, and the area for supporting the magnet driving unit will be referred to as a magnet housing. The lens housing and the magnet housing of each of the first lens support unit 110 and the second lens support unit 210 may be integrally formed or may be separately formed and then coupled. According to an embodiment of the present invention, protrusions into which the first pin 51 and the second pin 52 are fitted may be formed on each of the first lens support unit 110 and the second lens support unit 210.

Hereinafter, for convenience of description, the first lens assembly will be mainly described in more detail with reference to FIG. 5. However, the same structure or an appropriately modified structure may also be applied to the second lens assembly. Referring to FIG. 5, a lens housing 112 of the first lens support unit 110 functions as a barrel or a body tube, and the first lens group 100 may be mounted therein. Here, the first lens group 100 may be a moving lens group and may include one or more lenses. The first magnet driving unit 310 may be disposed on a magnet housing 114 of the first lens support unit 110.

According to an embodiment of the present invention, a mounting method of the first magnet driving unit 310 may be a vertical mounting method. For example, both an N pole and an S pole of the first magnet driving unit 310 may be mounted to face the first coil driving unit 320. Accordingly, the N pole and the S pole of the first magnet driving unit 310 may be disposed to correspond to an area in which a current flows in a Y-axis direction perpendicular to a ground surface in the first coil driving unit 320.

When a magnetic force (MF) is applied in an X-axis direction at the N pole of the first magnet driving unit 310 and a current flows in a direction opposite to a Y-axis in the first coil driving unit 320, an electromagnetic force acts in a direction parallel to a Z-axis direction according to Fleming's left hand rule.

Alternatively, when an MF is applied in a direction opposite to the X-axis at the S pole of the first magnet driving unit 310 and a current flows in the Y-axis direction perpendicular to a ground surface in the first coil driving unit 320, an electromagnetic force acts in the Z-axis direction according to Fleming's left hand rule.

In this case, since the first coil driving unit 320 is in a fixed state, the first lens assembly 1110 in which the first magnet driving unit 310 is disposed may be moved in a direction parallel to a direction opposite to the Z-axis. An electromagnetic force may be controlled in proportion to a current applied to the first coil driving unit 320.

Here, one or more protrusions 114P into which the pin 51 is fitted may be formed in the magnet housing 114, and accordingly, the movement of the first lens assembly 1110 may be guided in an optical axis direction. For example, a hole may be formed in the protrusion 114P, and the pin 51 may be fitted into the hole.

As described above, when the pin 51 fixed to the base (not shown) or the like is fitted into the hole formed in the protrusion 114P of the magnet housing 114, a contact area between the pin 51 and the magnet housing 114 can be minimized to minimize the weight of the magnet housing 114, thereby reducing frictional resistance. Accordingly, there is a technical effect of preventing occurrence of frictional torque during zooming to improve a driving force and reduce power consumption.

According to an embodiment of the present invention, the protrusion 114P and the hole may further be formed at the other side opposite to one side at which the first driving unit 300 is disposed among both sides of the magnet housing 114, and the pin 52 may be fitted into the protrusion 114P. Accordingly, the movement of the first lens assembly 1110 can be guided at both sides, thereby preventing a lens from being tilted or a central axis thereof from being misaligned and precisely guiding the first lens assembly 1110 to be parallel to the optical axis direction.

Meanwhile, as described above, according to an embodiment of the present invention, each of the first coil driving unit 320 and the second coil driving unit 420 may include a yoke and a coil.

FIG. 6 is a schematic cross-sectional view of the driving unit according to an embodiment of the present invention, and FIG. 7 is a schematic cross-sectional view of a driving unit according to another embodiment of the present invention. For convenience of description, the first driving unit 300 will be mainly described, but the same structure may be applied to the second driving unit 400.

Referring to FIGS. 6 and 7, the first coil driving unit 320 includes a yoke part 322 and a coil 324 disposed on the yoke part 322. In this case, a Hall sensor HS may further be disposed inside the coil 324, and the Hall sensor HS may detect a position of the first magnet driving unit 310 by sensing a distribution of a surrounding magnetic field. The coil 324 and the Hall sensor HS may be disposed on a circuit board 326. Here, the circuit board 326 may include a circuit board having an electrically connectable line pattern, such as a rigid printed circuit board (rigid PCB), a flexible PCB, or a rigid flexible PCB. The circuit board 326 may be connected to a certain power supply (not shown) to apply power to the coil 324 and the Hall sensor HS.

The yoke part 322 may be made of a magnetic metal. Accordingly, when a current is applied to the coil 324, an electromagnetic force may be generated between the first magnet driving unit 310 and the coil 324, and an MF may also be generated between the first magnet driving unit 310 and the yoke part 322. Here, the MF generated between the first magnet driving unit 310 and the yoke part 322 may be a mutual attractive force. A propulsion force for moving the first magnet driving unit 310 together with the first lens assembly 1110 in an arrow direction is generated by the electromagnetic force between the first magnet driving unit 310 and the coil 324 and the MF between the first magnet driving unit 310 and the yoke part 322.

Since both of the first lens assembly 1110 and the first magnet driving unit 310 move, hereinafter, both of the first lens assembly 1110 and the first magnet driving unit 310 are collectively referred to as a "moving assembly."

Meanwhile, according to the trend of ultra-slim, ultra-small, and high-resolution camera devices, there are restrictions on a propulsion force for moving the moving assembly and a movement distance thereof. That is, a magnitude of an attractive force between the first magnet driving unit 310 and the yoke part 322 may vary according to the material, size, and thickness of the yoke part 322, and accordingly, a propulsion force for moving the moving assembly may vary.

For example, in FIG. 6, when the yoke part 322 is made of a weak magnetic material, since an attractive force between the first magnet driving unit 310 and the yoke part 322 is weak, it may be difficult to obtain a sufficient propulsion force for moving the moving assembly. In particular, for high-magnification zooming, the moving assembly needs to move a certain distance or more, but when a propulsion force is low, a required movement distance may not be secured. On the other hand, when the yoke part 322 is made of a ferromagnetic material, since an attractive force between the first magnet driving unit 310 and the yoke part 322 is strong, it is possible to obtain a sufficient propulsion force for moving the moving assembly, but a distribution of an attractive force of the yoke part 322 may be non-uniform. Thus, a frictional force according to movement of the moving assembly may not be uniformly distributed. When a frictional force is non-uniform, it may be difficult to precisely control movement of the moving assembly. In addition, both cases in which the yoke part 322 is made of a weak magnetic material and is made of a ferromagnetic material, since a distribution of a magnetic field according to movement of the moving assembly is non-uniform, precise sensing and control may be difficult.

In an embodiment of the present invention, in order to solve such problems, the coil 324 is disposed on the yoke part 322, and the yoke part 322 includes a first yoke 322-1 and a second yoke 322-2 disposed on the first yoke 322-1. That is, the second yoke 322-2 is disposed between the first yoke 322-1 and the coil 324.

In this case, magnetism of the first yoke 322-1 may be stronger than that of the second yoke 322-2. For example, permeability of the first yoke 322-1 may be greater than that of the second yoke 322-2. Preferably, the permeability of the first yoke 322-1 may be 1,000 times or more, preferably 2,000 times or more, and more preferably 3,000 times or more the permeability of the second yoke 322-2. For example, a relative permeability of the first yoke 322-1 may be 100 or more, preferably 200 or more, more preferably 300 or more, still more preferably 600 or more, and yet still more preferably 1,000 or more, and a relative permeability of the second yoke 322-2 may be 1 or less and preferably 0.1 or less. For example, the first yoke 322-1 may be made of a ferromagnetic material, and the second yoke 322-2 may be made of a weak magnetic material. Preferably, the first yoke 322-1 may include a ferritic metal, and the second yoke 322-2 may include an austenitic metal.

Accordingly, an attractive force may act between the first magnet driving unit 310 and the yoke part 322, and a repulsive force may act between the first yoke 322-1 and the second yoke 322-2. Since ferromagnetism of the first yoke 322-1 is canceled due to the repulsive force between the first yoke 322-1 and the second yoke 322-2, and weak magnetism of the second yoke 322-2 is reinforced, the yoke part 322 may have an intermediate characteristic between a ferromagnetic material and a weak magnetic material.

That is, a large propulsion force can be obtained as compared with a case in which the yoke part 322 is made of only a weak magnetic material, thereby increasing a movement distance of the moving assembly and implementing high-magnification zooming. In addition, since distributions of an attractive force and an MF of the coil 324 are uniform as compared with a case in which the yoke part 322 is made of only a ferromagnetic material, a frictional force according to a position of the moving assembly can be uniformly controlled, thereby increasing the reliability of position sensing and control of the moving assembly.

In particular, according to an embodiment of the present invention, when the second yoke 322-2 having relatively weak magnetism is disposed between the first yoke 322-1 having relatively strong magnetism and the coil 324, the second yoke 322-2 can cancel a magnetic field of the first yoke 322-1 having strong magnetism, which faces the first magnet driving unit 310, and thus, an MF in the yoke part 322 can be uniformly distributed. Accordingly, even when a position of the moving assembly is changed according to movement of the moving assembly, a uniform frictional force acts to the moving assembly. In addition, according to an embodiment of the present invention, when the second yoke 322-2 having relatively weak magnetism is disposed between the first yoke 322-1 having relatively strong magnetism and the coil 324, loss of an MF of the coil 324 can be prevented, thereby increasing the sensing sensitivity for a position of the moving assembly.

As described above, when the first yoke 322-1 having a characteristic of a ferromagnetic material, the second yoke 322-2 having a characteristic of a weak magnetic material, and the coil 324 are sequentially disposed, due to the first yoke 322-1 having the characteristic of the ferromagnetic material, it is possible to obtain a propulsion force capable of implementing a movement distance sufficient to implement high-magnification zooming, and due to the second yoke 322-2 having the characteristic of the weak magnetic material, the magnetism of the first yoke 322-1 is partially canceled, and an MF is uniformly distributed throughout the yoke part 322, thereby obtaining precise sensing and control performance.

In this case, a thickness of at least one of the first yoke 322-1 and the second yoke 322-2 may be 10 μm or more and 100 μm or less. In particular, when the thickness of the second yoke 322-2 is less than 10 μm, it may be difficult to cancel an MF of the first yoke 322-1. In FIG. 7, all of the first yoke 322-1, the second yoke 322-2, and the circuit board 326 are illustrated as having the same thickness, but the present invention is not limited thereto. A propulsion force required to move the moving assembly may vary according to a frictional force of the moving assembly, and the thickness of the first yoke 322-1, the second yoke 322-2, and the circuit board 326 may be adjusted according to the required propulsion force. For example, when the lens assembly is guided by a pin type shown in FIGS. 4 and 5, a frictional force may be small as compared with a case in which the lens assembly is guided by a ball type (to be described below with reference to FIGS. 8 to 12). When a frictional force is low, a distance between the movable assembly and the first yoke 322-1 may be adjusted to be longer as compared with a case in which a frictional force is high. That is, the distance between the movable assembly and the first yoke 322-1 may be adjusted through a method of adjusting the thickness of the circuit board 326 to be increased or a method of adjusting the thickness of the second yoke 322-2 to be increased.

Meanwhile, according to an embodiment of the present invention, a width of the second yoke 322-2 may be greater than or equal to a width of the first yoke 322-1. Accordingly, since the second yoke 322-2 is disposed between the first yoke 322-1 and the coil 324, the ferromagnetism of the first yoke 322-1 may not directly affect the coil 324.

Although the structure of the first lens assembly 1110 has been mainly described, embodiments of the present invention are not limited thereto, and a yoke part of the second coil driving unit included in the second lens assembly 1120 may also have the same structure.

Meanwhile, the camera modules including an actuator for an OIS and an actuator for AF or zooming have been mainly described, and in particular, an example of a pin type has been described in which the lens assembly of the first actuator 1100 performing a zooming function or an AF function is guided by a guide pin has, but the present invention is not limited thereto. An actuator performing a zooming function or an AF function may be a ball type guided by a ball.

FIG. 8 is a perspective view of an actuator for AF or zooming according to another embodiment of the present invention. FIG. 9 is a perspective view illustrating the actuator according to the embodiment shown in FIG. 8 from which some components are omitted, and FIG. 10 is an exploded perspective view illustrating the actuator according to the embodiment shown in FIG. 8 from which some components are omitted.

Referring to FIG. 8, an actuator 2100 according to the embodiment may include a base 2020, a circuit board 2040 disposed outside the base 2020, a driving unit 2142, and a third lens assembly 2130.

FIG. 9 is a perspective view illustrating the base 2020 and the circuit board 2040 being omitted in FIG. 8. Referring to FIG. 9, the actuator 2100 according to the embodiment may include a first guide part 2210, a second guide part 2220, a first lens assembly 2110, a second lens assembly 2120, a driving unit 2141, and the driving unit 2142.

The driving unit 2141 and the driving unit 2142 may each include a coil or a magnet.

For example, when each of the driving unit 2141 and the driving unit 2142 includes the coil, the driving unit 2141 may include a first coil part 2141b and a first yoke 2141a, and the driving unit 2142 may include a second coil part 2142b and a second yoke 2142a. According to an embodiment of the present invention, at least one of the first yoke 2141a and the second yoke 2142a may have the structure of the above-described yoke part according to the embodiment of the present invention. That is, at least one of the first yoke 2141a and the second yoke 2142a includes two yoke layers having different magnetisms, and magnetism of the yoke layer disposed relatively far from the coil may be greater than that of the yoke layer disposed relatively close to the coil.

On the other hand, the driving unit 2141 and the driving unit 2142 may each include the magnet.

Referring to FIG. 10, the actuator 2100 according to the embodiment may include the base 2020, the first guide part 2210, the second guide part 2220, the first lens assembly 2110, the second lens assembly 2120, and the third lens assembly 2130.

For example, the actuator 2100 according to the embodiment may include the base 2020, the first guide part 2210 disposed at one side of the base 2020, the second guide part 2220 disposed at the other side of the base 2020, the first lens assembly 2110 corresponding to the first guide part 2210, the second lens assembly 2120 corresponding to the second guide part 2220, first balls 2117 disposed between the first guide part 2210 and the first lens assembly 2110 (see FIG. 11A), and second balls (not shown) disposed between the second guide part 2220 and the second lens assembly 2120.

In addition, the actuator 2100 according to the embodiment may include the third lens assembly 2130 disposed in front of the first lens assembly 2110 in an optical axis direction.

Referring to FIGS. 9 and 10, the actuator 2100 according to the embodiment may include the first guide part 2210 disposed adjacent to a first sidewall of the base 2020 and the second guide part 2220 disposed adjacent to a second sidewall of the base 2020.

The first guide part 2210 may be disposed between the first lens assembly 2110 and the first sidewall of the base 2020.

The second guide part 2220 may be disposed between the second lens assembly 2120 and the second sidewall of the base 2020. The first sidewall and the second sidewall of the base 2020 may be disposed to face each other.

According to an embodiment, in a state in which the first guide part 2210 and the second guide part 2220 precisely and numerically controlled are coupled in the base 2020, when the lens assemblies are driven, frictional torque is reduced to reduce frictional resistance, thereby obtaining technical effects of improving a driving force, reducing power consumption, and improving control characteristics during zooming.

Accordingly, according to an embodiment, during zooming, it is possible to minimize frictional torque and also prevent a phenomenon in which a lens is decentered or tilted or central axes of a lens group and an image sensor are not aligned, thereby providing a combined technical effect of considerably improving image quality or resolution.

In particular, according to the present embodiment, since the first guide part 2210 and the second guide part 2220, which are assembled by being formed separately from the base 2020, are separately adopted without arranging a guide rail on the base itself, there is a special technical effect capable of preventing a gradient from occurring in an injection direction.

In an embodiment, the first guide part 2210 and the second guide part 2220 may be injection-molded along an X-axis and may have an injection length that is less than that of the base 2020. In this case, when rails are disposed on the first guide part 2210 and the second guide part 2220, there are technical effects of minimizing the occurrence of a gradient during injection and lowering a possibility that a straight line of the rail is twisted.

More specifically, FIG. 11a is a perspective view of the first lens assembly 2110 in the actuator according to the embodiment shown in FIG. 10, and FIG. 11b is a perspective view illustrating the first lens assembly 2110 shown in FIG. 11a from which some components are removed.

Briefly referring to FIG. 10, the actuator 2100 according to the embodiment may include the first lens assembly 2110 moving along the first guide part 2210 and the second lens assembly 2120 moving along the second guide part 2220.

Referring again to FIG. 11a, the first lens assembly 2110 may include a first lens barrel 2112a in which a first lens 2113 is disposed and a first driving unit housing 2112b in which a driving unit 2116 is disposed. The first lens barrel 2112a and the first driving unit housing 2112b may be a first housing, and the first housing may have a barrel or body tube shape. The driving unit 2116 may be a magnet driving unit but is not limited thereto, and a coil may be disposed in some cases.

In addition, the second lens assembly 2120 may include a second lens barrel (not shown) in which a second lens (not shown) is disposed and a second driving unit housing (not shown) in which a driving unit (not shown) is disposed. The second lens barrel (not shown) and the second driving unit housing (not shown) may be a second housing, and the second housing may have a barrel or body tube shape. The driving unit may be a magnet driving unit but is not limited thereto, and a coil may be disposed in some cases.

The driving unit 2116 may correspond to two first rails 2212.

In an embodiment, driving may be performed using one or more balls. For example, the actuator 2100 according to the embodiment may include the first balls 2117 disposed between the first guide part 2210 and the first lens assembly 2110 and the second balls (not shown) disposed between the second guide part 2220 and the second lens assembly 2120.

For example, according to an embodiment, the first balls 2117 may include one or more first-first balls 2117a disposed at an upper side of the first driving unit housing 2112b and one or more first-second balls 2117b disposed at a lower side of the first driving unit housing 2112b.

In an embodiment, the first-first ball 2117a of the first balls 2117 may move along a first-first rail 2212a which is one of the first rails 2212, and the first-second ball 2117b of the first balls 2117 may move along a first-second first rail 2212b which is the other one of the first rails 2212.

According to an embodiment, since the first guide part includes the first-first rail and the first-second rail, the first-first rail and the first-second rail guide the first lens assembly 2110, thereby providing a technical effect of increasing the accuracy of optical axis alignment with the second lens assembly 2110 when the first lens assembly 2110 moves.

Referring to FIG. 11b, in an embodiment, the first lens assembly 2110 may include first assembly grooves 2112b1 in which the first balls 2117 are disposed. The second lens assembly 2120 may include second assembly grooves (not shown) in which the second balls are disposed.

The plurality of first assembly grooves 2112b1 of the first lens assembly 2110 may be formed. In this case, a distance between two first assembly grooves 2112b1 among the plurality of first assembly grooves 2112b1 may be greater than a thickness of the first lens barrel 2112a in an optical axis direction.

In an embodiment, the first assembly groove 2112b1 of the first lens assembly 2110 may have a V shape. In addition, the second assembly groove (not shown) of the second lens assembly 2120 may have a V shape. In addition to the V shape, the first assembly groove 2112b1 of the first lens assembly 2110 may have a U shape or a shape in contact with the first ball 2117 at two or three points. In addition to the V shape, the second assembly groove (not shown) of the first lens assembly 2110 may have a U shape or a shape in contact with the second ball at two or three points.

Referring to FIGS. 10 and 11a, in an embodiment, the first guide part 2210, the first ball 2117, and the first assembly groove 2112b1 may be disposed on a virtual straight line in a direction from the first sidewall toward the second sidewall. The first guide part 2210, the first ball 2117, and the first assembly groove 2112b1 may be disposed between the first sidewall and the second sidewall.

Next, FIG. 12 is a perspective view of the third lens assembly 2130 in the actuator according to the embodiment shown in FIG. 10.

Referring to FIG. 12, in an embodiment, the third lens assembly 2130 may include a third housing 2021, a third barrel, and a third lens 2133.

In an embodiment, since the third lens assembly 2130 has a barrel recess 2021r formed in an upper end portion of the third barrel, a thickness of the third barrel of the third lens assembly 2130 can be uniformly set, and there can be a combined technical effect of reducing an amount of injection products to increase the accuracy of numerical management.

In addition, according to an embodiment, the third lens assembly 2130 may include a housing rib 2021a and a housing recess 2021b in the third housing 2021.

In an embodiment, since the third lens assembly 2130 includes the housing recess 2021b in the third housing 2021, there is a combined technical effect of reducing an amount of injection products to increase the accuracy of numerical management, and concurrently, since the third lens assembly 2130 includes the housing rib 2021a in the third housing 2021, there is a combined technical effect capable of securing strength.

Hereinafter, a detailed structure of a second actuator will be described in more detail.

FIG. 13 is a perspective view of the second actuator of the camera device shown in FIGS. 1 to 3 in one direction, and FIG. 14 is a perspective view of the second actuator of FIG. 13 in another direction. FIG. 15 is a perspective view of a second circuit board and a driving unit of the second actuator of FIG. 12. FIG. 16 is a partially exploded perspective view of the second actuator of FIG. 13. FIG. 17 is a perspective view illustrating the second actuator of FIG. 13 from which the second circuit board is removed.

Referring to FIGS. 13 to 17, since a shake correction unit 1220 is disposed under a prism unit 1230, it is possible to overcome a limitation on a size of a lens in a lens assembly of an optical system when an OIS is implemented, thereby securing a sufficient amount of light.

A second circuit board 1250 may be connected to a certain power supply (not shown) to apply power to a coil driving unit 72C. The second circuit board 1250 may include a circuit board having an electrically connectable line pattern, such as a rigid PCB, a flexible PCB, or a rigid flexible PCB.

The coil driving unit 72C may include one or more unit coil driving units and may include a plurality of coils. For example, the coil driving unit 72C may include a first unit coil driving unit 72C1, a second unit coil driving unit 72C2, a third unit coil driving unit 72C3, and a fourth unit coil driving unit (not shown).

In addition, the coil driving unit 72C may further include Hall sensors (not shown) to detect a position of a magnet driving unit 72M to be described below. For example, the first unit coil driving unit 72C1 may include a first Hall sensor (not shown), and the third unit coil driving unit 72C3 may include a second Hall sensor (not shown). Although not shown, the coil driving unit 72C included in a second actuator 1200 may also be disposed together with a yoke part. Here, the yoke part may be the yoke part according to the embodiment of the present invention. That is, the yoke part may include a first yoke and a second yoke disposed on the first yoke, the coil driving unit 72C may be disposed on the second yoke, and magnetism of the first yoke may be greater than that of the second yoke.

Meanwhile, as described above, a shaper member 1222 may be disposed on a lens member 1224, and a shape of the lens member 1224 may be deformed according to movement of the shaper member 1222. In this case, the magnet driving unit 72M may be disposed on the shaper member 1222, and the coil driving unit 72C may be disposed in a housing 1210.

Referring to FIG. 16, the housing 1210 may have a certain opening 1212H, through which light may pass, formed in a housing body 1212. The housing 1210 may include housing side portions 1214P which extend upward from the housing body 1212 and have holes 1214H formed such that the coil driving unit 72C is disposed therein.

For example, the housing 1210 may include a first housing side portion 1214P1 which extends upward from the housing body 1212 and has a hole 1214H1 formed such that the coil driving unit 72C is disposed therein and a second housing side portion 1214P2 has a hole 1214H2 formed such that the coil driving unit 72C is disposed therein.

According to an embodiment, the coil driving unit 72C may be disposed in the housing side portion 1214P, the magnet driving unit 72M may be disposed on the shaper member 1222, the shaper member 1222 may be moved by an electromagnetic force between the coil driving unit 72C and the magnet driving unit 72M according to a voltage applied to the coil driving unit 72C. Accordingly, the shape of the lens member 1224 may be reversibly deformed, and an optical path of light passing through the lens member 1224 may be changed, thereby implementing an OIS.

More specifically, the shaper member 1222 may include a shaper body having a hole, through which light may pass, formed therein, and protrusions extending laterally from the shaper body. The lens member 1224 may be disposed under the shaper body, and the magnet driving unit 72M may be disposed on the protrusion of the shaper member 1222. For example, a part of the magnet driving unit 72M may be disposed on the protrusion disposed on one side surface of the shaper member 1222, and a remaining part thereof may be disposed on the protrusion disposed on the other side surface of the shaper member 1222. In this case, the magnet driving unit 72M may be disposed to be coupled to the shaper member 1222. For example, a groove is formed in the protrusion of the shaper member 1222, and the magnet driving unit 72M may be fitted into the groove.

Meanwhile, a fixed prism 1232 may be a right-angled prism and may be disposed inside the magnet driving unit 72M of the shake correction unit 1220. In addition, a certain prism cover 1234 may be disposed above the fixed prism 1232 so that the fixed prism 1232 may be tightly coupled to the housing 1210.

Meanwhile, a camera module according to an embodiment of the present invention is subjected to a process of, after the assembly of each component is completed, testing whether the module is abnormal, including an open-short (OS) test, a color test, a pixel test, and the like. When the performance of a module is evaluated, since a signal is received from an image sensor to evaluate characteristics of the module, actually, whether a camera module is abnormal is checked by supplying an operation signal and power to an electronic component on which the camera module is mounted.

A socket is provided in which a camera module may be seated, the camera module is seated inside this socket, and then, pins for receiving power and control signals of the camera module are connected to electrically conductive terminals of the socket, thereby performing such a test. In general, the socket is provided to have a structure that is openable or closable, when the camera module is tested, the socket is opened to seat the camera module on a module seating portion provided inside the socket, and then, the socket is closed to connect the pins of the camera module and the terminals of the socket.

Meanwhile, there is a problem in that various types of sockets should be provided according to a shape of a test object such as a camera module.

Hereinafter, a socket for a test device capable of easily testing test objects having various shapes will be described.

FIG. 18 is a perspective view of a socket for a test device according to an embodiment of the present invention. FIG. 19 is an exploded perspective view of the socket for a test device according to the embodiment of the present invention. FIG. 20 is a top view of the socket for a test device according to the embodiment of the present invention. FIG. 21 is a side view of the socket for a test device according to the embodiment of the present invention. FIG. 22 is a bottom view of the socket for a test device according to the embodiment of the present invention. FIG. 23 is a cross-sectional view of the socket for a test device according to the embodiment of the present invention.

First, referring to FIGS. 18 and 19, a socket 3010 for a test device according to the embodiment includes a first plate 3110, a second plate 3120, a plurality of pins 3130 disposed between the first plate 3110 and the second plate 3120, and a shape frame 3140 disposed in the second plate 3120.

The socket 3010 for a test device according to the embodiment may further include a third plate 3150 disposed between the first plate 3110 and the second plate 3120 and a housing 3160. Detailed descriptions thereof will be provided below.

In addition, it should be understood that some components of the components may be excluded and additional components are not excluded.

A first direction (Z' direction) is a direction from the second plate 3120 toward the first plate 3110, a second direction (Y' direction) is a direction perpendicular to the first direction (Z' direction), and a third direction (X' direction) is a direction perpendicular to both the first direction (Z' direction) and the second direction (Y' direction). In the present specification, descriptions will be provided based on the above-described directions.

The first plate 3110 may be disposed at one side in the first direction (Z' direction). For example, the first plate 3110 may be positioned at an upper side of the socket 3010 for a test device.

The first plate 3110 may include a plurality of first holes h1. The plurality of first holes h1 may be disposed to correspond to the plurality of pins 3130 positioned in the second plate 3120. In an embodiment, the plurality of first holes h1 may be disposed to overlap the plurality of pins 3130 in the first direction (Z' direction). Accordingly, the plurality of pins 3130 may be lifted to pass through the first holes h1. For example, when the plurality of pins 3130 are lifted, one ends of the plurality of pins 3130 may pass through the first holes h1 to be positioned above an upper surface of the first plate 3110.

Referring to FIG. 20, the first plate 3110 may include a non-seating portion which overlaps an opening area 3141 of the shape frame 3140, which will be described below, in the first direction (Z' direction) by the plurality of pins 3130 and a seating portion which overlaps a non-opening area 3142 in the first direction (Z' direction) and in which the test object (not shown) is accommodated.

Specifically, the test object (not shown) may be disposed above the first holes h1. In an embodiment, the first holes h1 may include first-first holes 3111 through which the pins 3130 pass and first-second holes 3112 through which the pins 3130 do not pass. The first-first holes 3111 may overlap the non-seating portion in the first direction (Z' direction), and the first-second holes 3112 may form the seating portion and thus overlap the seated portion in the first-direction (Z' direction).

In addition, the test object (not shown) may be accommodated in the seating portion. In other words, the test object (not shown) may be disposed above the first-second hole 3112. In addition, the test object (not shown) may overlap the first-second holes 3112 in the first direction (Z' direction). However, since the pins 3130 pass through the firs-first holes 3111, the test object is not accommodated on the pins 3130 in the non-seating portion.

In addition, in the non-seating portion, the pins 3130 may be disposed to surround a portion of the test object (not shown). Due to such a configuration, the test object (not shown) may be seated on the seating portion and concurrently fixed and supported by the pins 3130 of the non-seating portion. Thereby, it is possible to prevent a decrease in reliability due to a test. However, it should be understood that the first-first hole 3111 and the first-second hole 3112 may be changed according to the shape frame 3140.

The first plate 3110 may include coupling parts 3113 at one sides thereof. The coupling part 3113 may include a coupling hole 3113a and a coupling member 3113b disposed in the coupling hole 3113a. The plurality of coupling parts 3113 may be provided, and the first plate 3110 may be coupled to the second plate 3120 and the third plate 3150, which will be described below, through the coupling parts 3113. A coupling method may include screw coupling as shown in the drawings, but the present invention is not limited thereto.

Referring again to FIGS. 18 and 19, the first plate 3110 may have various shapes. For example, the first plate 3110 may have a quadrangular shape shown in the drawings. However, the present invention is not limited thereto, and the first plate 3110 may have a shape such as a circular shape or a polygonal shape.

In addition, the pin 3130 may not pass though a central portion of the first plate 3110 in a plan view of X'-Y'. That is, the first hole h1 may not be positioned at the central portion of the first plate 3110 in the plane view of X'-Y'.

As described above, according to an embodiment, in the first plate 3110, the number of the first holes h1 may be removed by as much as a basic size (minimum size) of the test object (not shown). Accordingly, it is possible to reduce manufacturing costs and improve the reliability of the first plate.

In addition, a through-hole may be formed in an area of the first plate 3110 corresponding to the basic size (minimum size) of the above-described test object (not shown). Since the through-hole does not overlap the plurality of pins 3130 in the first direction (Z' direction), the pins 3130 may not be disposed therein. However, heat generated when the test object (not shown) is disposed in the area to perform a test can be easily discharged to the outside. Accordingly, it is possible to improve the reliability of the test object and the first plate. The second plate 3120 and the third plate 3150 to be described below may further include through-holes corresponding to the above-described through-hole.

The second plate 3120 may be disposed apart from the first plate 3110 in the first direction (Z' direction). The second plate 3120 may be disposed under the first plate 3110.

In addition, the second plate 3120 may correspond to the shape of the first plate 3110. For example, the second plate 3120 may have the same quadrangular shape as the first plate 3110. However, as described above, as the shape of the first plate 3110 is changed, the shape of the second plate 3120 may also be changed.

In addition, the second plate 3120 may include a first cavity CV1 and a second cavity CV2. The first cavity CV1 may be formed in one side of the second plate 3120, and the second cavity CV2 may be formed in the other side of the second plate 3120. That is, the first cavity CV1 may be formed to face the second cavity CV2 in the second plate 3120. In addition, the first cavity CV1 and the second cavity CV2 may have the same area in the plan view of X'-Y'. However, the present invention is not limited thereto, and an area of the first cavity CV1 in the plan view of X'-Y' may be smaller than an area of the second cavity CV2 in the plan view of X'-Y'.

In addition, the first cavity CV1 may be formed to overlap the second cavity CV2 in the first direction (Z' direction). The plurality of pins 3130 may be disposed in the first cavity CV1. On the other hand, the shape frame 3140 may be disposed in the second cavity CV2.

Due to such a configuration, a space in which the test object may be seated on the first plate 3110 may be provided according to the shape frame 3140 disposed in the second cavity CV2. In other words, even when a shape (for example, a size or form) of the test object is changed, the test object can be easily seated only by changing a shape of the shape frame 3140. Detailed descriptions thereof will be provided below.

In addition, the first cavity CV1 may include a first area S1 in which the plurality of pins 3130 are disposed and a second area S2 disposed inside the first area S1. The second area S2 may not overlap the plurality of first holes h1 and a plurality of second holes h2 in the first direction (Z' direction). The second area S2 may be an area corresponding to a basic position or size of the above-described test object (not shown). Accordingly, the above-described through-hole may be formed in the second area S2. Detailed descriptions thereof will be provided below with reference to FIG. 23.

In addition, the second plate 3120 may include the plurality of second holes h2. The plurality of second holes h2 may be disposed to correspond to the plurality of first holes h1 described above. In an embodiment, the plurality of second holes h2 may be disposed to overlap the plurality of first holes h1 in the first direction (Z' direction). In addition, the plurality of second holes h2 may be disposed to overlap the plurality of pins 3130 in the first direction (Z' direction). Accordingly, the plurality of pins 3130 may pass through the second plate 3120 through the second holes h2. For example, the other ends of the plurality of pins 3130 may pass through the second holes h2 to be positioned under a lower surface of the second plate 3120.

In addition, the plurality of second holes h2 may be positioned inside the first cavity CV1 or the second cavity CV2.

The plurality of pins 3130 may be positioned in the first cavity CV1. The plurality of pins 3130 may at least partially overlap the second plate 3120 in the second direction (Y' direction) or the third direction (X' direction).

Each of the plurality of pins 3130 may include a body portion 3131, a first extension portion 3132 extending from the body portion 3131 toward the first plate 3110, and a second extension portion 3133 extending from the body portion 3131 toward the second plate 3120.

First, a length of the body portion 3131 in the second direction (Y' direction) or the third direction (X' direction) may be less than a length of the first extension portion 3132 in the second direction (Y' direction) or the third direction (X' direction). In addition, the length of the body portion 3131 in the second direction (Y' direction) or the third direction (X' direction) may be less than a length of the second extension portion 3133 in the second direction (Y' direction) or the third direction (X' direction).

Due to such a configuration, as the pin 3130 moves in the first direction (Z' direction) (for example, moves up and down), the first extension portion 3132 may provide the seating portion according to a shape of the test object positioned on the first plate 3110. As a result, it is possible to easily hold the test object and concurrently easily perform a test irrespective of the shape of the test object.

In addition, in this case, the body portion 3131 may be positioned in contact with a lower surface of the first hole h1 of the first plate or a lower surface of a third hole h3 of the third plate under the seating portion. In addition, the body portion 3131 may be positioned in contact with an upper surface of the second hole h2 of the second plate under the non-seating portion.

The first extension portion 3132 may have a structure that protrudes from the body portion 3131 toward the first hole h1 or the third hole h3. A shape of the first extension portion 3132 may correspond to that of the first hole h1 or the third hole h3. Accordingly, the plurality of pins 3130 may easily pass through the first holes h1 or the third holes h3.

The second extension portion 3133 may protrude from the body portion 3131 toward the second plate 3120. That is, the second extension portion 3133 may extend from the body portion 3131 toward the second hole h2 and overlap the second hole h2 in the first direction (Z' direction).

The second extension portion 3133 may at least partially overlap the opening area 3141 in the second direction (Y' direction) or the third direction (X' direction). However, the second extension portion 3133 may not overlap the non-opening area 3142 in the second direction (Y' direction) or the third direction (X' direction).

Thus, the second extension portion 3133 may be positioned above the non-opening area 3142. Accordingly, as described above, the non-seating portion and the seating portion may be formed on the first plate 3110 by the shape frame 3140.

The shape frame 3140 may be disposed in the second cavity CV2. The shape frame 3140 may at least partially overlap the second holes h2 in the first direction (Z' direction).

In an embodiment, the shape frame 3140 may include the opening area 3141 and the non-opening area 3142. The pins 3130 passing through the second holes h2 may be positioned in the opening area 3141. The non-opening area 3142 may support the pin 3130 such that a lower end of the pin 3130 is not positioned in the second cavity CV2. That is, the non-opening area 3142 may lift the pin 3130.

Referring to FIGS. 21 and 22, the pins 3130 passing through the second holes h2 may overlap the opening area 3141 in the second direction (Y' direction) or the third direction (X' direction). On the other hand, the pins 3130 disposed in the second holes h2 may not overlap the non-opening area 3142 in the second direction (Y' direction) or the third direction (X' direction) and may overlap the non-opening area 3142 in the first direction (Z' direction). That is, the plurality of pins 3130 may pass through the first plate 3110 in the first direction (Z' direction) to correspond to the shape frame 3140. In addition, the plurality of pins 3130 may pass through one or more of the plurality of first holes h1 and the plurality of second holes h2 according to the opening area 3141 and the non-opening area 3142 of the shape frame 3140.

Due to such a configuration, the pins 3130 in the non-opening area 3142 may protrude upward from the first plate 3110, thereby forming the non-seating portion. On the other hand, the pins 3130 in the opening area 3141 may protrude downward from the second plate 3120 and may not protrude upward from the first plate 3110, thereby forming the seating portion.

The pins 3130 may be lifted upward from the first plate 3110 by the shape frame 3140. In addition, the pins 3130 may be lowered downward from the second plate 3120 by the shape frame 3140. Due to the above-described lifting and lowering, a shape of the seating portion may be formed to correspond to a shape of the opening area 3141. In other words, when the shape of the opening area 3141 is formed to correspond to the test object (not shown), the shape of the seating portion may correspond to the shape of the test object (not shown). That is, even when the shape of the test object (not shown) is diverse, when the shape of the opening area 3141 is changed to correspond to the shape of the test object, the test object can be easily seated on the first plate without changing other components (first plate, second plate, third plate, pins, and the like).

Referring again to FIGS. 18 and 19, the third plate 3150 may be disposed between the first plate 3110 and the second plate 3120. In addition, the third plate 3150 may be disposed between the first plate 3110 and the body portion 3131 of the pin 3130.

The third plate 3150 may include a plurality of third holes h3. The plurality of third holes h3 may overlap the first holes h1, the second holes h2, and the pins 3130 in the first direction (Z' direction). A length of the third hole h3 in the second direction (Y' direction) or the third direction (X' direction) may be less than a length of the body portion 3131 in the second direction (Y' direction) or the third direction (X' direction). Due to such a configuration, the body portion 3131 may be positioned under the third hole h3.

Since the third plate 3150 is disposed between the body portion 3131 and the first plate 3110, even when the pin 3130 is lifted, a position of the pin 3130 may be maintained through the third hole h3 such that the pin 3130 is not tilted in the second direction (Y' direction) or the third direction (X' direction). Accordingly, in the socket for a test device according to the embodiment, a shape of the non-seating portion or the seating portion is prevented from being changed by the tilt of the pin 3130, thereby improving the seating and fixing of the test object.

Referring to FIG. 23, as described above, in an area overlapping the opening area 3141 of the shape frame 3140 in the first direction (Z' direction), the pin 3130 may be lowered (k2). In an area overlapping the non-opening area 3142 of the shape frame 3140 in the first direction (Z' direction), the pin 3130 may be lifted (k1).

A test object 3200 may be seated on the area in which the pin 3130 is lowered. Here, the test object 3200 may be the entirety or portion of the camera module described with reference to FIGS. 1 to 17. That is, since a seating portion SR overlaps the opening area 3141 in the first direction (Z' direction) and the pin 3130 is lowered, the first extension portion 3132 may be positioned under an upper surface of the first plate 3110. In other words, in the seating portion SR, the pin 3130 may not pass through the first plate 3110. In addition, the upper surface of the first plate 3110 is planarized to easily support the test object 3200.

On the other hand, since the non-seating portion VSR overlaps the non-opening area 3142 in the first direction (Z' direction) and the pin 3130 is lifted by the shape frame 3140, the first extension portion 3132 may be positioned on the upper surface of the first plate 3110 and the second extension portion 3133 may be positioned on the lower surface of the second plate 3120. That is, in the non-seating portion VSR, the pin 3130 may not pass through the second plate 3120. In the non-seating portion VSR, the pin 3130 may pass through the first plate 3110.

Accordingly, in the socket for a test device according to the embodiment, even when the test object 3200 is changed, a test can be performed only by changing or replacing the shape frame 3140 at a lower side. That is, in the socket for a test device according to the embodiment, parts may be quickly and easily replaced according to a camera module, thereby improving test operation efficiency.

In addition, as described above, a portion of the second extension portion 3133 of the pin 3130 may overlap the opening area 3141 in the second direction (Y' direction) or the third direction (X' direction). In addition, a portion of the first extension portion 3132 of the pin 3130 may pass through the first plate 3110, and one end thereof may be positioned on the upper surface of the first plate 3110. However, the second extension portion 3133 of the pin 3130 may not pass through the second plate 3120 under the seating portion SR, and the other end thereof may be positioned in the second hole h2 of the second plate 3120. Accordingly, a lower surface of the socket for the test device is maintained to be flat, thereby minimizing position movement in the housing to be described below.

In addition, in an embodiment, a width W1 of the body portion 3131 in the second direction (Y' direction) or the third direction (X' direction) may be greater than a width W2 of the first extension portion 3132 in the second direction (Y' direction) or the third direction (X' direction). Furthermore, the width W1 of the body portion 3131 in the second direction (Y' direction) or the third direction (X' direction) may be greater than a width W3 of the second extension portion 3133 in the second direction (Y' direction) or the third direction (X' direction). Due to such a configuration, even when the pin 3130 is lifted, the highest point and the lowest point may be fixed so that the seating portion and the non-seating portion may be easily formed.

In addition, the width W2 of the first extension portion 3132 in the second direction (Y' direction) or the third direction (X' direction) may be the same as the width W3 of the second extension portion 3133 in the second direction (Y' direction) or the third direction (X' direction). Due to such a configuration, it is possible to easily provide the shape of the seating portion to correspond to the shape of the shape frame 3140, and it is possible to minimize an error between the shape frame and the seating portion.

A length L1 of the body portion 3131 in the first direction (Z'-direction) may be less than a length L2 of the first extension portion 3132 in the first direction (Z' direction). In addition, the length L1 of the body portion 3131 in the first direction (Z'-direction) may be different from a length L3 of the second extension portion 3133 in the first direction (Z' direction). In an embodiment, the length L1 of the body portion 3131 in the first direction (Z'-direction) may be less than the length L3 of the second extension portion 3133 in the first direction (Z' direction). Accordingly, even though a length of the first cavity CV1 in the first direction (Z' direction) is short, a lifting range of the pin 3130 may be increased.

In an embodiment, a ratio between the length L1 of the body portion 3131 in the first direction (Z'-direction) and a length L0 of the pin 3130 in the first direction (Z'-direction) may be in a range of 1:2 to 1:3.5. Since the ratio is in a range of 1:2 to 1:3.5, the formation of the seating portion/non-seating portion according to the lifting of the pin 3130 can be easily changed, and the reliability of the pin 3130 can be improved.

In addition, the length L2 of the first extension portion 3132 in the first direction (Z' direction) may be greater than the length L3 of the second extension portion 3133 in the first direction (Z' direction). Accordingly, even when the pin 3130 is lifted by being supported by the shape frame 3140, strength applied to a lower portion thereof is improved, thereby improving the reliability of the pin.

In addition, the length L3 of the second extension portion 3133 in the first direction (Z' direction) may be greater than a minimum length L4 of the second plate 3120 in the first direction (Z' direction). The minimum length L4 of the second plate 3120 in the first direction (Z' direction) may be the same as a length of the second hole h2 in the first direction (Z' direction).

In addition, the length L3 of the second extension portion 3133 in the first direction (Z' direction) may be less than lengths (L4+L5) of the second hole h2 and the second cavity CV2 in the first direction (Z' direction). Accordingly, a lowermost portion of the second extension portion 3133 may be positioned in the second cavity CV2 and may not be positioned under a lowermost surface of the second plate 3120. Accordingly, even when the socket for the test device is easily seated on a flat plane surface and is pressed in the housing, the pressing may not damage to the pin 3130.

As described above, the first cavity CV1 may include the first area S1 in which the plurality of pins 3130 are disposed and the second area S2 disposed inside the first area S1. The second area S2 may not overlap the plurality of first holes h1 and the plurality of second holes h2 in the first direction (Z' direction). The second area S2 may be an area corresponding to the basic position or size of the test object 3200.

The first area S1 may at least partially overlap the non-seating portion VSR in the first direction (Z' direction). In addition, the second area S2 may at least partially overlap the seating portion SR in the first direction (Z' direction). However, it should be understood that the first area S1 and the second area S2 may not overlap the seating portion SR and the non-seating portion VSR in the first direction (Z' direction) according to the shape of the shape frame 3140.

As described above, the second area S2 may be variably changed according to the basic size of the test object 3200. For example, the second area S2 may also be positioned outside the first area S1 according to the shape of the test object.

FIGS. 24 to 27 are views for describing a specific example of a socket for a test device according to an embodiment.

Specifically, FIG. 24a is a top view of a socket for a test device and illustrates a seating portion SR2 and a non-seating portion VSR2, and FIG. 24b is a plan view of a shape frame 3140 and illustrates an opening area 3141b and a non-opening area 3142b.

Referring to FIGS. 24a and 24b, it can be seen that the opening area 3141b corresponds to a shape of the seating portion SR2, and the non-opening area 3142b corresponds to a shape of the non-seating portion VSR2. In the non-seating portion VSR2, pins 3130 pass through a first plate 3110 and protrude upward, and in the seating portion SR2, the pins 3130 do not pass through the first plate 3110.

Similarly, FIG. 25a is a top view of a socket for a test device and illustrates a seating portion SR3 and a non-seating portion VSR3, and FIG. 25b is a plan view of a shape frame 3140 and illustrates an opening area 3141c and a non-opening area 3142c. In addition, FIG. 26a is a top view of a socket for a test device and illustrates a seating portion SR4 and a non-seating portion VSR4, and FIG. 26b is a plan view of a shape frame 3140 and illustrates an opening area 3141d and a non-opening area 3142d. In addition, FIG. 27a is a top view of a socket for a test device and illustrates a seating portion SR1 and a non-seating portion VSR1, and FIG. 27b is a plan view of a shape frame 3140 and illustrates an opening area 3141a and a non-opening area 3142a.

Referring to FIGS. 25a, 25b, 26a, 26b, 27a, and 27b, it can be seen that the opening areas 3141c, 3141d, and 3141a correspond to shapes of the seating portions SR3, SR4, and SR1, and the non-opening areas 3142c, 3142d, and 3142a correspond to shapes of the non-seating portions VSR3, VSR4, and VSR1. In the non-seating portions VSR3, VSR4, and VSR1, pins 3130 pass through a first plate 3110 and protrude upward, and in the seating portions SR3, SR4, and SR1, the pins 3130 do not pass through the first plate 3110.

As described above, the shapes of the seating portion and the non-seating portion may vary according to the shape of the shape frame 3140, in particular, the shapes of the opening area and the non-opening area.

FIGS. 28 and 29 are views for describing a test using a socket for a test device according to an embodiment of the present invention.

Referring to FIGS. 28 and 29, the socket for a test device according to the embodiment may further include a housing 3160.

Specifically, the housing 3160 may include a first cover 3161, a second cover 3162, and a connection part 3163 for connecting the first cover 3161 and the second cover 3162.

The first cover 3161 may be disposed at an upper side, and a test object may be mounted thereon. The first cover 3161 may include an open hole Ph. Accordingly, when the test object is a camera module mounted on a mobile terminal, light may be supplied to the camera module through the open hole Ph. Accordingly, the open hole Ph may be provided as a plurality of open holes Ph according to the number of the test objects. For example, when two camera modules are mounted on a mobile terminal, two open holes Ph may be formed as shown in the drawing. However, as described above, the number of the open holes Ph may be changed according to the test object.

In addition, the open hole Ph in the first cover 3161 may be disposed at the same position as the camera module on the mobile terminal. In addition, a mounting groove may be formed in the first cover 3161 such that the mobile terminal mounted with the camera module is mounted therein. A jig 3161a corresponding to a shape of the mobile terminal or camera module may be positioned in the mounting groove 3161a.

In addition, the first cover 3161 may include a connector part 3161b disposed to drive the camera module. However, the connector part 3161b is not limited to being positioned in the first cover 3161, and the connector part 3161b may be positioned in the first cover 3161 or the second cover 3162.

In addition, the connector part 3161b is electrically connected to the mobile terminal or the camera module, and an electrical signal for testing whether the camera module operates correctly may pass therethrough. In addition, the connector part 3161b is not limited to the above-described position and may be disposed at one of various positions.

The second cover 3162 may be positioned to face the first cover 3161. For example, the second cover 3162 may be positioned under the first cover 3161.

The second cover 3162 may have a seating groove SV in which the above-described socket (a configuration including a first plate, a second plate, pins, and a third plate) may be seated. The seating groove SV may be disposed at a position corresponding to the open hole Ph of the first cover 3161.

The connection part 3163 may be in contact with the first cover 3161 and the second cover 3162 to couple the first cover 3161 and the second cover 3162. For example, the connection part 3163 may have a rotatable structure, but the present invention is not limited thereto.

FIG. 30 shows views of a socket for a test device according to another embodiment of the present invention.

In the socket for a test device according to another embodiment, first holes h1 may have different diameters according to positions. A diameter r1 of a first-first hole h1a positioned inside a first plate may be greater than a diameter r2 of a first-second hole h1b positioned outside the first plate. Due to such a configuration, when a seating portion is formed at an inner side, a separation distance between a non-seating portion and a test object can be minimized so that the test object can be easily supported and fixed by pins of the non-seating portion.

Here, the inner side refers to a side in a direction toward a center point C1 of the first plate, and an outer side refers to a side in a direction opposite to the inner side and in a direction away from the center point C1 of the first plate.

The center point C1 of the first plate may be an intersection between a first virtual line OL1 that bisects a first side surface SF1 and a second side surface SF2 facing each other and a second virtual line OL2 that bisects a third side surface SF3 and a fourth side surface SF4 facing each other. The center point C1 may be the center of gravity of the first plate in a plan view of X-Y. For example, when the first plate has a circular shape, a center of a circle may be the center point, and when a shape of the first plate is changed, the center point may be changed correspondingly.

In addition, in the socket for a test device according to another embodiment, it should be understood that, similarly to the first holes h1, diameters of second holes h2 and third holes h3, which overlap the first holes h1 in a first direction (Z' direction), may be changed according to positions.

In addition, the above-described contents may be equally applied to configurations of a second plate, the pins, a third plate, and the like which are not described herein.

FIG. 31 shows views of a socket for a test device according to still another embodiment of the present invention.

Referring to FIG. 31, in the socket for a test device according to still another embodiment, separation distances between first holes h1 may be different according to positions. A separation distance d2 between the first holes h1 positioned inside a first plate may be less than a separation distance d1 between the first holes h1 positioned outside the first plate. Due to such a configuration, when a seating part is formed at an inner side, a shape of the seating portion is finely adjusted, thereby minimizing a separation distance between a test object and a non-seating portion. Accordingly, the test object can be easily supported and fixed by pins in the non-seating portion adjacent to the seating portion.

As described above, the inner side refers to a side in a direction toward a center point C1 of the first plate, and an outer side refers to a side in a direction opposite to the inner side and in a direction away from the center point C1 of the first plate.

The center point C1 of the first plate may be an intersection between a first virtual line OL1 that bisects a first side surface SF1 and a second side surface SF2 facing each other and a second virtual line OL2 that bisects a third side surface SF3 and a fourth side surface SF4 facing each other. The center point C1 may be the center of gravity of the first plate in a plan view of X-Y. For example, when the first plate has a circular shape, a center of a circle may be the center point, and when a shape of the first plate is changed, the center point may be changed correspondingly.

In addition, the socket for a test device according to still another embodiment, it should be understood that, similarly to the first holes h1, diameters of second holes h2 and third holes h3, which overlap the first holes h1 in a first direction (Z' direction), may be changed according to positions.

In addition, the above-described contents may be equally applied to configurations of a second plate, the pins, a third plate, and the like which are not described herein.

FIG. 32 shows views of a socket for a test device according to a modified example.

Referring to FIG. 32, a width W2' of a first extension portion 3132 in a second direction (Y' direction) or a third direction (X' direction) may be different from a width W3' of a second extension portion 3133 in the second direction (Y' direction) or the third direction (X' direction).

When the width W2' of the first extension portion 3132 in the second direction (Y' direction) or the third direction (X' direction) is greater than the width W3' of the second extension portion 3133 in the second direction (Y' direction) or the third direction (X' direction), a shape of a shape frame 3140 may be finely controlled. That is, the number of the second extension portions 3133 in contact with the shape frame 3140 may be more precisely controlled.

In addition, on the other hand, the width W2' of the first extension portion 3132 in the second direction (Y' direction) or the third direction (X' direction) may be less than the width W3' of the second extension portion 3133 in the second direction (Y' direction) or the third direction (X' direction). In this case, a tolerance of a seating portion may be increased so that, even when a size of a test object is slightly changed, the test object may be seated.

In addition, the above-described contents may be equally applied to configurations of a second plate, the pins, a third plate, and the like which are not described herein.

According to an embodiment, it is possible to implement a socket for a test device which easily performs a test on test objects having various shapes.

In addition, it is possible to implement a socket for a test device which can easily perform a test only by replacing some components even when a type of a test object is changed.

The various and advantageous advantages and effects of the present invention are not limited to the above description and may be more easily understood in the course of describing specific embodiments of the present invention.

The present invention has been described based on the embodiments, but the embodiments are for illustrative and do not limit the present invention, and those skilled in the art will appreciate that various modifications and applications, which are not exemplified in the above description, may be made without departing from the scope of the essential characteristic of the present embodiments. For example, each component described in detail in the embodiment can be modified. Further, the differences related to the modification and the application should be construed as being included in the scope of the present invention defined in the appended claims.

DESCRIPTIONS OF REFERENCE NUMERALS

1100: first actuator
1110: first lens assembly
1120: second lens assembly
100: first lens group
110: first lens support unit
300: first driving unit
310: first magnet driving unit
320: first coil driving unit
322-1: first yoke
322-2: second yoke
324: coil

The invention claimed is:

1. A camera module comprising:
a lens group;
a lens support unit configured to accommodate the lens group;
a magnet disposed on an outer surface of the lens support unit;
a yoke part that is disposed apart from and faces the magnet; and
a coil disposed on the yoke part to face and be spaced apart from the magnet between the magnet and the yoke part,
wherein:
all the lens group, the lens support unit, and the magnet move along an optical axis according to a current applied to the coil;
the yoke part includes a first yoke and a second yoke disposed on the first yoke;
the second yoke is disposed between the first yoke and the coil; and
a permeability of the first yoke is 1,000 times or more that a permeability of the second yoke.

2. The camera module of claim 1, wherein:
the first yoke includes a ferritic metal; and
the second yoke includes an austenitic metal.

3. The camera module according to claim 2, wherein the second yoke has a thickness of 10 μm or more and 100 μm or less.

4. The camera module of claim 1, wherein a width of the second yoke is greater than a width of the first yoke.

5. The camera module of claim 1, wherein a thickness of the first yoke is different from a thickness of the second yoke.

6. The camera module of claim 1, further comprising:
a base; and
a pin coupled to the base,
wherein the lens support unit moves along the pin.

7. The camera module of claim 1, further comprising a sensor disposed in the coil and configured to detect a distance by which the lens group, the lens support unit, and the magnet move.

8. The camera module of claim 1, further comprising:
a base;
a guide part disposed at one side of the base; and
a ball disposed between the guide part and the lens support unit,
wherein the lens support unit moves along the ball.

9. A camera module comprising:
a lens group;
a lens support unit configured to accommodate the lens group;
a magnet disposed on an outer surface of the lens support unit;
a yoke part that is disposed apart from and faces the magnet; and
a coil disposed on the yoke part to face and be spaced apart from the magnet between the magnet and the yoke part,
wherein:
all of the lens group, the lens support unit, and the magnet move along an optical axis according to a current applied to the coil;
the yoke part includes a first yoke and a second yoke disposed on the first yoke;
the second yoke is disposed between the first yoke and the coil;
a permeability of the first yoke is stronger than a permeability of the second yoke;
an attractive force acts between the magnet and the yoke part; and
a repulsive force acts between the first yoke and the second yoke.

* * * * *